US010263960B2

(12) United States Patent
Fujikami et al.

(10) Patent No.: US 10,263,960 B2
(45) Date of Patent: Apr. 16, 2019

(54) WIRELESS COMMUNICATION SYSTEM AND WIRELESS COMMUNICATION METHOD

(71) Applicant: Mitsubishi Electric Corporation, Tokyo (JP)

(72) Inventors: Shintaro Fujikami, Tokyo (JP); Yukimasa Nagai, Tokyo (JP); Takenori Sumi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 162 days.

(21) Appl. No.: 15/306,916

(22) PCT Filed: Jul. 14, 2014

(86) PCT No.: PCT/JP2014/068720
§ 371 (c)(1),
(2) Date: Oct. 26, 2016

(87) PCT Pub. No.: WO2016/009479
PCT Pub. Date: Jan. 21, 2016

(65) Prior Publication Data
US 2017/0054694 A1    Feb. 23, 2017

(51) Int. Cl.
*H04L 9/32*    (2006.01)
*H04L 29/06*    (2006.01)
(Continued)

(52) U.S. Cl.
CPC ............ *H04L 63/0428* (2013.01); *H04L 9/08* (2013.01); *H04L 9/0863* (2013.01); *H04L 9/14* (2013.01);
(Continued)

(58) Field of Classification Search
None
See application file for complete search history.

(56) References Cited

U.S. PATENT DOCUMENTS

2005/0201564 A1*    9/2005    Kayashima ........... H04L 9/0891
                                                            380/283
2008/0025512 A1    1/2008    Nakajima
(Continued)

FOREIGN PATENT DOCUMENTS

JP    2007-88727 A    4/2007
JP    2008-35371 A    8/2008
(Continued)

OTHER PUBLICATIONS

IEEE Computer Society, "IEEE Standard for Information technology—Telecommunications and information exchange between systems Local and metropolitan area networks—Specific requirements: Part 11: Wireless LAN Medium Access Control (MAC) and Physical Layer (PHY) Specifications", IEEE Standards Association, 802.11-2012, Mar. 29, 2012, pp. 1-3.

*Primary Examiner* — Brandon S Hoffman
(74) *Attorney, Agent, or Firm* — Birch, Stewart, Kolasch & Birch, LLP

(57) ABSTRACT

A wireless communication device 1 encrypts a passphrase which corresponds to a communication mode after change and which is a character string for authentication by using an encryption key PTK corresponding to a communication mode before change, and transmits the encrypted passphrase to a wireless communication device 2, and also creates an encryption key PTK corresponding to the communication mode after change from the passphrase corresponding to the communication mode after change. The wireless communication device 2 receives the encrypted passphrase transmitted from the wireless communication device 1 and decrypts the encrypted passphrase by using an encryption key PTK corresponding to the communication mode before change, and also creates an encryption key PTK corresponding to the
(Continued)

communication mode after change from the decrypted passphrase.

10 Claims, 18 Drawing Sheets

(51) Int. Cl.
*H04L 9/08* (2006.01)
*H04L 9/14* (2006.01)
*H04W 12/04* (2009.01)
*H04W 12/06* (2009.01)

(52) U.S. Cl.
CPC ........... *H04L 63/083* (2013.01); *H04W 12/04* (2013.01); *H04W 12/06* (2013.01)

(56) References Cited

U.S. PATENT DOCUMENTS

2013/0324042 A1 12/2013 Shinomiya
2014/0181943 A1 6/2014 Arashin et al.

FOREIGN PATENT DOCUMENTS

| JP | 2008-193272 A | 8/2008 |
| JP | 2010-178054 A | 8/2010 |
| JP | 2013-26981 A | 2/2013 |
| JP | 2013-85050 A | 5/2013 |
| JP | 2013-232728 A | 11/2013 |
| JP | 2013-251873 A | 12/2013 |
| WO | WO 2014/024351 A1 | 2/2013 |

* cited by examiner

FIG.14

| Subtype | Value |
|---|---|
| Mode Change Request | 1 |
| Mode Change Response | 2 |
| Mode Change Confirm | 3 |

WIRELESS COMMUNICATION SYSTEM AND WIRELESS COMMUNICATION METHOD

TECHNICAL FIELD

The present invention relates to a wireless communication system in which a plurality of wireless communication devices carry out wireless communications with one another, and a wireless communication method.

BACKGROUND ART

In recent years, communication modes in a wireless LAN (Local Area Network) (IEEE (The Institute of Electric and Electronics Engineers) 802.11a/b/g/n/ac) have been diversified. For example, the following communication modes are provided:
  ad-hoc mode,
  STA mode (infrastructure mode),
  AP mode (infrastructure mode),
  Wi-Fi direct mode,
  WiGig (Wireless Gigabit) mode, and
  NAN (Neighborhood Area Network) mode.

For example, a device, such as a PC or a smart phone, equipped with a wireless communication device having a wireless communication function for wireless LAN supports a plurality of communication modes.

Therefore, by selecting a communication mode corresponding to a service which the user desires the device to perform from among the plurality of communication modes and setting the selected communication mode to the wireless communication device, and causing the wireless communication device to carry out wireless communications with another wireless communication device in this communication mode, the device, such as a PC or a smart phone, executes an application which provides the above-mentioned service.

Encryption methods for wireless LAN include a WEP (Wired Equivalent Privacy) method, a WAPI (Wireless lan Authentication and Privacy Infrastructure) method, a WPA (Wi-Fi Protected Access) method, and a WPA2 method.

Further, the WPA method includes a WPA-Personal method using an encryption key PSK (Pre Shared Key) which is a prior common key, and a WPA-Enterprise method using IEEE802.11x authentication, and the WPA2 method includes a WPA2-Personal method using an encryption key PSK (Pre Shared Key) which is a prior common key, and a WPA2-Enterprise method using IEEE802.11x authentication.

In the WEP method, a character string (WEP key) inputted by the user is set as an encryption key, and communication data is encrypted by using the encryption key.

In the WPA-Personal method and the WPA2-Personal method, a PMK (Pairwise Master Key) which is an encryption key for creating an encryption key PSK, and an encryption key GTK (Group Transient Key) used for broadcasting or multicasting is created.

In the following patent literature 1, a technique of facilitating a connecting process when the communication mode is changed from an ad-hoc mode to an infrastructure mode is described.

Further, the following patent literature 2 proposes a method of, because in a WiGig mode for millimeter wave communications, there is a case in which the role (STA or PCP) of a wireless communication device is not fixed and changes before and after the completion of a key exchange using WPS (Wi-Fi Protected Setup), and exchanged keys cannot be used, mutually exchanging keys in advance, thereby making it possible to establish a connection even if the role of the wireless communication device changes before and after the completion of the key exchange using WPS.

Further, the following patent literatures 3 proposes a method of promptly changing from a communication mode in which to operate using a Wi-Fi method (802.11n) to a communication mode in which to operate using a WiGig method.

According to this method, by performing an authentication and key delivery process for the WiGig method by using the Wi-Fi method in advance between wireless communication devices connected to each other using the Wi-Fi method, an authentication and key delivery process at the time of establishing a connection by using the WiGig method can be eliminated.

CITATION LIST

Patent Literature

Patent Literature 1: Japanese Unexamined Patent Application Publication No. 2013-26981
Patent Literature 2: Japanese Unexamined Patent Application
Publication No. 2013-232728
Patent Literature 3: WO2014/024351

SUMMARY OF INVENTION

Technical Problem

Because the conventional wireless communication systems are configured as above, by using one of the techniques disclosed by patent literatures 1 to 3, the connecting process at the time when the communication mode is changed can be facilitated, and the changing of the communication mode can be speeded up. A problem with wireless communication devices each equipped with a wireless communication function for wireless LAN is, however, that when the service which the user desires a wireless communication device to perform differs from the current service, the wireless communication device needs to temporarily release a connection with another wireless communication device with which the connection has been established and change the communication mode, and, after that, re-establish a connection with the other wireless communication device, and, when re-establishing a connection, the user needs to perform a troublesome operation of re-inputting a passphrase.

Another problem is that the user needs to re-input, for example, a PIN code, PushButton, etc., in addition to the re-inputting of a passphrase, and it takes much time to complete the re-establishment of a connection because after the user's re-inputting operation, the wireless communication devices transmit and receive many frames between the devices to reset up encryption keys, re-allocate IP addresses, and perform another operation.

The present invention is made in order to solve the above-mentioned problems, and it is therefore an object of the present invention to provide a wireless communication system and a wireless communication method capable of completing re-establishment of a connection in a short time without causing the user to perform a troublesome operation of re-inputting a passphrase or the like, and without transmitting and receiving many frames.

Solution to Problem

According to the present invention, there is provided a wireless communication system in which a first wireless communication device includes: a passphrase transmitter to, when changing the communication mode of wireless communications, encrypt a passphrase which corresponds to a communication mode after change and which is a character string for authentication by using an encryption key corresponding to a communication mode before change, and to transmit the encrypted passphrase to a second wireless communication device; and a first encryption key creator to create an encryption key corresponding to the communication mode after change from the passphrase corresponding to the communication mode after change, and the second wireless communication device includes: a passphrase receiver to receive the encrypted passphrase transmitted from the passphrase transmitter and to decrypt the above-mentioned encrypted passphrase by using the encryption key corresponding to the communication mode before change; and a second encryption key creator to create an encryption key corresponding to the communication mode after change from the passphrase decrypted by the passphrase receiver, and in which the first and second wireless communication devices carry out the wireless communications with each other by using the encryption keys created by the first and second encryption key creators.

Advantageous Effects of Invention

The wireless communication system according to the present invention is configured in such a way that when changing the communication mode of the wireless communications, the first wireless communication device encrypts the passphrase which corresponds to the communication mode after change and which is a character string for authentication by using the encryption key corresponding to the communication mode before change, and transmits the encrypted passphrase to the second wireless communication device, and also creates an encryption key corresponding to the communication mode after change from the passphrase corresponding to the communication mode after change, and the second wireless communication device receives the encrypted passphrase transmitted from the first wireless communication device and decrypts the above-mentioned encrypted passphrase by using the encryption key corresponding to the communication mode before change, and also creates an encryption key corresponding to the communication mode after change from the decrypted passphrase, so that there is an advantage in that the re-establishment of a connection can be completed in a short time without causing the user to perform a troublesome operation of re-inputting a passphrase, and so on, and without transmitting and receiving many frames.

BRIEF DESCRIPTION OF DRAWINGS

FIG. 14 is an explanatory drawing showing subtype of an action frame;

DESCRIPTION OF EMBODIMENTS

Hereafter, in order to explain this invention in greater detail, the preferred embodiments of the present invention will be described with reference to accompanying drawings.

Embodiment 1

Figure 1:
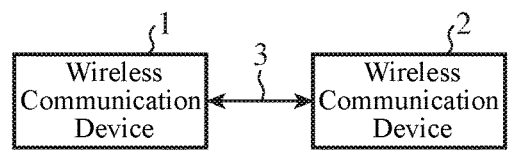
FIG. 1 is a block diagram showing a wireless communication system according to Embodiment 1 of the present invention.

FIG. 1 is a block diagram showing a wireless communication system according to Embodiment 1 of the present invention.

Referring to FIG. 1, a wireless communication device 1 which is a first wireless communication device is connected, via a wireless link 3, to a wireless communication device 2 which is a second wireless communication device.

Each of the wireless communication devices 1 and 2 has a function of, while carrying out wireless communications in a certain communication mode, changing the communication mode when, for example, the user performs an operation of making a request to change the communication mode.

There is a superior-inferior relationship between the wireless communication device 1 and the wireless communication device 2. In the example shown in FIG. 1, for convenience of explanation, it is assumed that the wireless communication device 1 operates as a master station and the wireless communication device 2 operates as a slave station.

The wireless link 3 connecting between the wireless communication device 1 and the wireless communication device 2 can use one of frequency bands usually used for wireless LAN devices, such as a 2.4 GHz band, a 5 GHz band and a 60 GHz band, and can use channels in any one of the frequency bands. The wireless link can use channels in a plurality of frequency bands.

Figure 2:
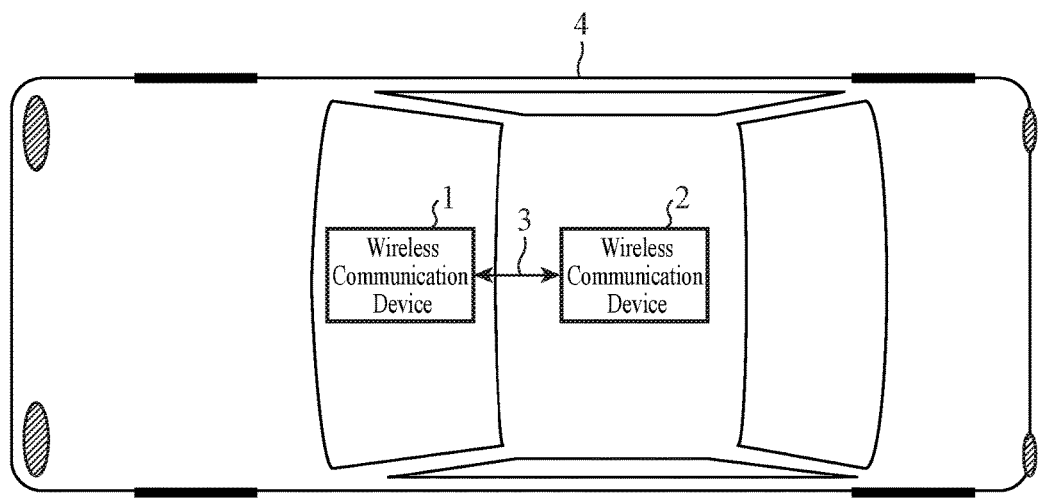
FIG. 2 is an explanatory drawing showing an example in which a wireless communication device 1 which constructs the wireless communication system shown in FIG. 1 is used as vehicle-mounted equipment.

FIG. 2 is an explanatory drawing showing an example in which the wireless communication device 1 which constructs the wireless communication system shown in FIG. 1 is used as vehicle-mounted equipment.

In the example shown in FIG. 2, the wireless communication device 1 is assumed to be vehicle-mounted equipment mounted in a car 4 (a vehicle), such as a head unit, a car navigation device, an audio device or a rear seat monitoring device.

Further, the wireless communication device 2 is assumed to be equipment carried into the car 4, such as a tablet, a smart phone, a portable game machine, a music player or a personal computer.

Although the example in which the wireless communication device 1 is used as vehicle-mounted equipment is shown in FIG. 2, the wireless communication device 2 can be alternatively used as vehicle-mounted equipment, or both of the wireless communication devices 1 and 2 can be alternatively used as pieces of vehicle-mounted equipment.

Figure 3:
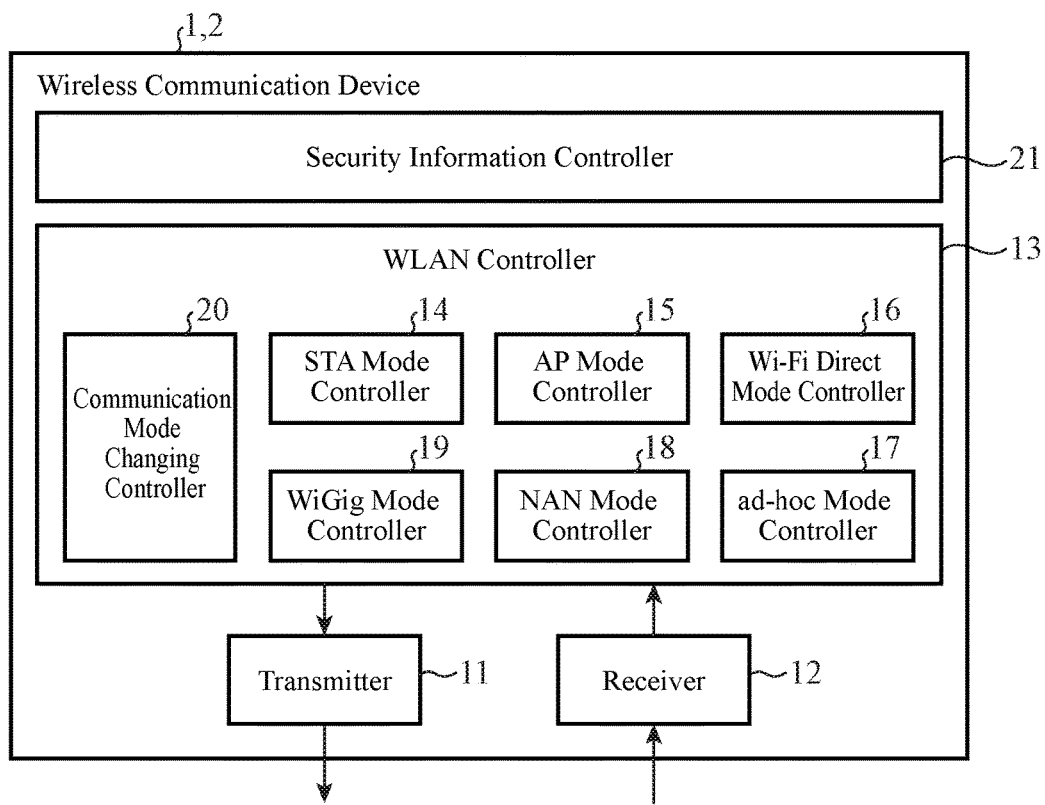
FIG. 3 is a block diagram showing the internal configurations of the wireless communication device 1 and a wireless communication device 2 which construct the wireless communication system shown in FIG. 1.

FIG. 3 is a block diagram showing the internal configuration of each of the wireless communication devices 1 and 2 which construct the wireless communication system shown in FIG. 1.

Referring to FIG. 3, a transmitter 11 is a wireless communication circuit having a transmission function conforming to, for example, IEEE802.11, and transmits a wireless LAN frame to a wireless communication device which is a communication partner connected thereto via the wireless link 3, under control by a WLAN controller 13. The transmitter also performs a carrier sense determining process based on carrier sense multiple access (CSMA) or collision avoidance (CA).

Because the carrier sense multiple access and the collision avoidance are known techniques, a detailed explanation of these techniques will be omitted hereafter.

A receiver 12 is a wireless communication circuit having a reception function conforming to, for example, IEEE802.11, and receives a wireless LAN frame transmitted from the wireless communication device which is the communication partner connected thereto via the wireless link 3. The receiver also performs a process of determining whether or not to transmit an ACK (acknowledgment) frame for a wireless LAN frame whose address is a unicast one.

The WLAN controller 13 includes an STA mode controller 14, an AP mode controller 15, a Wi-Fi direct mode controller 16, an ad-hoc mode controller 17, an NAN mode controller 18, a WiGig mode controller 19 and a communication mode switching controller 20, in order to support a plurality of communication modes.

When the communication mode is set to an STA mode in infrastructure modes, the STA mode controller 14 controls the wireless communications with the wireless communication device which is the communication partner in such a way that the wireless communications are performed in the STA mode.

When the communication mode is set to an AP mode in the infrastructure modes, the AP mode controller 15 controls the wireless communications with the wireless communication device which is the communication partner in such a way that the wireless communications are performed in the AP mode.

When the communication mode is set to a Wi-Fi direct mode, the Wi-Fi direct mode controller 16 controls the wireless communications with the wireless communication device which is the communication partner in such a way that the wireless communications are performed in the Wi-Fi direct mode.

When the communication mode is set to an ad-hoc mode, the ad-hoc mode controller 17 controls the wireless communications with the wireless communication device which is the communication partner in such a way that the wireless communications are performed in the ad-hoc mode.

When the communication mode is set to an NAN mode, the NAN mode controller 18 controls the wireless communications with the wireless communication device which is the communication partner in such a way that the wireless communications are performed in the NAN mode.

When the communication mode is set to a WiGig mode, the WiGig mode controller 19 controls the wireless communications with the wireless communication device which is the communication partner in such a way that the wireless communications are performed in the WiGig mode.

Although the example in which the WLAN controller 13 includes the STA mode controller 14, the AP mode controller 15, the Wi-Fi direct mode controller 16, the ad-hoc mode controller 17, the NAN mode controller 18 and the WiGig mode controller 19 are provided is shown in FIG. 3, the WLAN controller 13 can alternatively include two or more of the STA mode controller 14, the AP mode controller 15, the Wi-Fi direct mode controller 16, the ad-hoc mode controller 17, the NAN mode controller 18, and the WiGig mode controller 19 because the WLAN controller 13 has only to support at least two communication modes.

The communication mode switching controller 20 performs a process of changing the communication mode.

For example, when the user operates the wireless communication device 1 to input a request to change the communication mode, the communication mode switching controller 20 of the wireless communication device 1 outputs a wireless LAN frame onto which the communication mode change request showing a communication mode after change is superposed to the transmitter 11, thereby transmitting the wireless LAN frame to the wireless communication device 2, and also, when the receiver 12 receives a wireless LAN frame, on which response information showing whether or not it is possible to change the communication mode is superposed, from the wireless communication device 2, the communication mode switching controller 20 acquires this wireless LAN frame from the receiver 12.

On the other hand, when the receiver 12 receives the wireless LAN frame, on which the communication mode change request showing the communication mode after change is superposed, from the wireless communication device 1, the communication mode switching controller 20 of the wireless communication device 2 acquires this wireless LAN frame from the receiver 12.

Further, when the response information is superposed on the wireless LAN frame acquired from the receiver 12, and shows that it is possible to change the communication mode, the communication mode switching controller 20 of the wireless communication device 1 performs a process of changing the communication mode in accordance with the user's request.

When the communication mode change request is superposed on the wireless LAN frame acquired from the receiver 12, the communication mode switching controller 20 of the wireless communication device 2 determines whether or not it is possible to change to the communication mode shown by the communication mode change request, and outputs a wireless LAN frame onto which response information showing whether or not it is possible to change to this communication mode is superposed to the transmitter 11, thereby transmitting the wireless LAN frame to the wireless communication device 1. Further, when determining that it is possible to change to the communication mode shown by the communication mode change request, the communication mode switching controller performs a process of changing to this communication mode in accordance with the request from the wireless communication device 1.

A transmitter and receiver and a communication mode changer are comprised of the transmitter 11, the receiver 12 and the communication mode switching controller 20.

The example in which the user operates the wireless communication device 1 to input a request to change the communication mode is shown above. In contrast, when the user operates the wireless communication device 2 to input a request to change the communication mode, the wireless communication devices 1 and 2 operate in the ways configured by interchanging the above-mentioned ways in which they operate. In this case, the wireless communication device 2 constructs the first wireless communication device, and the wireless communication device 1 constructs the second wireless communication device.

A security information controller 21 controls authenticating processing and encryption processing between the wireless communication devices 1 and 2 when the communication mode changing controller 20 changes the communication mode.

More specifically, when the communication mode changing controller 20 changes the communication mode of the wireless communications, the security information controller of the wireless communication device 1, which is the master station, encrypts a passphrase which corresponds to the communication mode after change and which is a character string for authentication, by using an encryption key PTK corresponding to the communication mode before change, and outputs a wireless LAN frame onto which the encrypted passphrase is superposed to the transmitter 11, thereby transmitting the wireless LAN frame to the wireless communication device 2.

The security information controller 21 of the wireless communication device 1 also performs a process of creating an encryption key PTK corresponding to the communication mode after change from the passphrase corresponding to the communication mode after change.

The security information controller 21 of the wireless communication device 1, which is the master station, constructs a first encryption key creator, and this security information controller 21 and the transmitter 11 construct a passphrase transmitter.

When the receiver 12 receives the wireless LAN frame, on which the encrypted passphrase is superposed, from the wireless communication device 1, the security information controller 21 of the wireless communication device 2, which is the slave station, decrypts the encrypted passphrase superposed on the wireless LAN frame by using an encryption key PTK corresponding to the communication mode before change.

The security information controller 21 of the wireless communication device 2 also performs a process of creating an encryption key corresponding to the communication mode after change from the decrypted passphrase.

The security information controller 21 of the wireless communication device 2, which is the slave station, constructs a second encryption key creator, and this security information controller 21 and the receiver 12 construct a passphrase receiver.

In the example shown in FIG. 3, it is assumed that the transmitter 11 and the receiver 12, the WLAN controller 13 and the security information controller 21, which are the components of each of the wireless communication devices 1 and 2, are composed of pieces of hardware for exclusive use (e.g., semiconductor integrated circuits each equipped with a CPU (Central Processing Unit), or one chip microcomputers). As an alternative, each of the wireless communication devices 1 and 2 can be composed of a computer.

In the case in which each of the wireless communication devices 1 and 2 is composed of a computer, a program in which the details of processing performed by the transmitter 11, the receiver 12, the WLAN controller 13 and the security information controller 21 are described can be stored in a memory of the computer, and the CPU of this computer can be made to execute the program stored in the memory.

Figure 8:
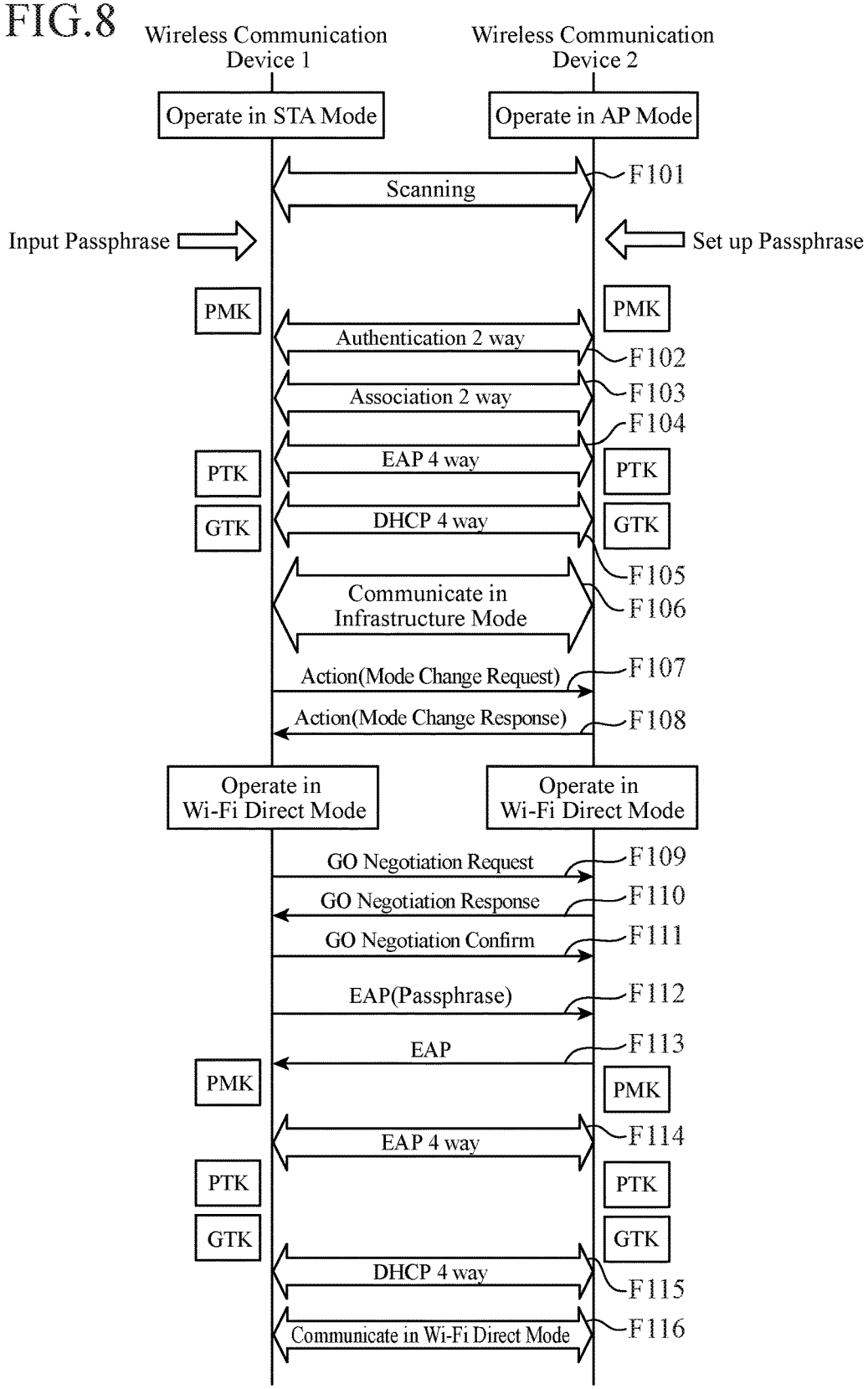
FIG. 8 is a sequence diagram showing a processing procedure at the time when the wireless communication devices 1 and 2 start wireless communications with each other, and a processing procedure at the time of changing the communication mode from an infrastructure mode to a Wi-Fi direct mode.

FIG. 8 is a sequence diagram showing a processing procedure at the time when the wireless communication devices 1 and 2 start wireless communications with each other, and a processing procedure at the time of changing the communication mode from an infrastructure mode to the Wi-Fi direct mode.

Figure 9:
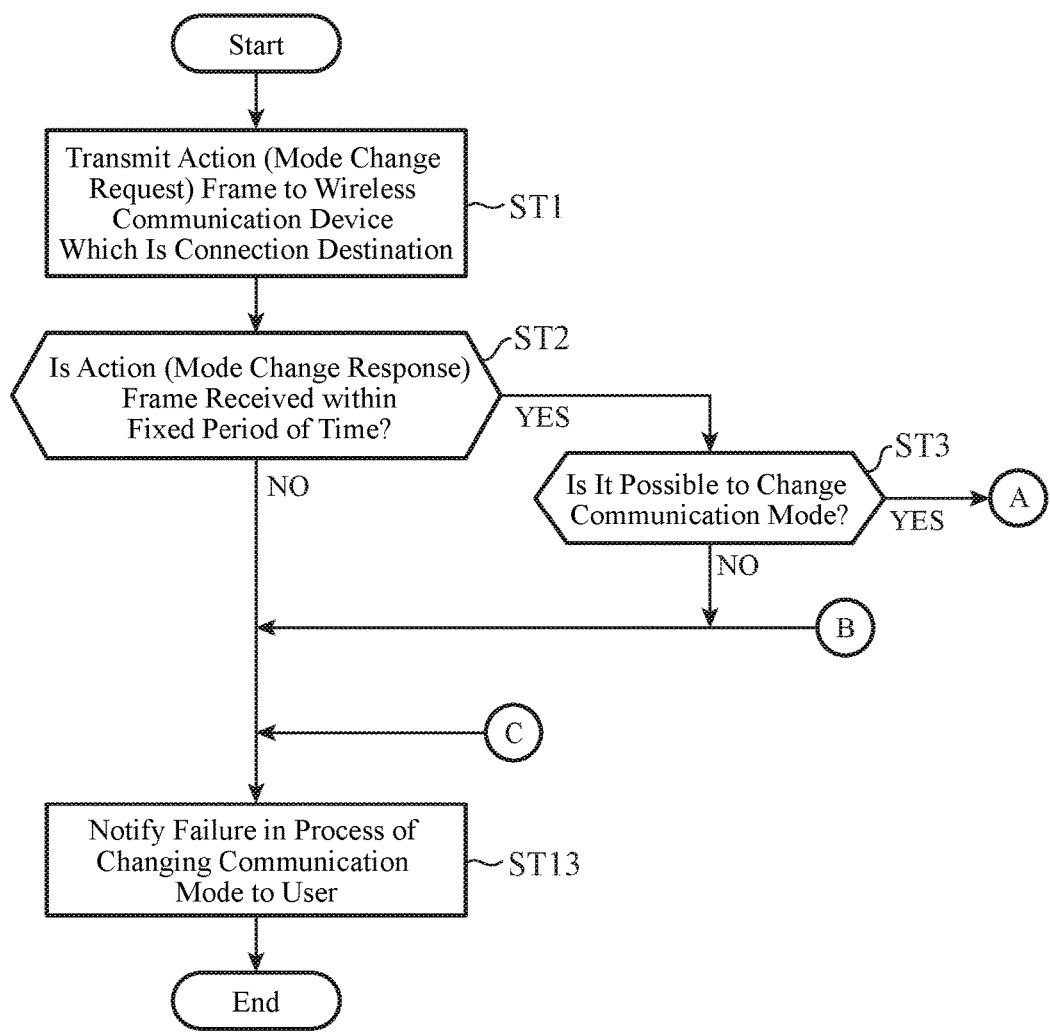
FIG. 9 is a flow chart showing a communication mode changing process performed by a wireless communication device which makes a request to change the communication mode (first half)
Figure 10:
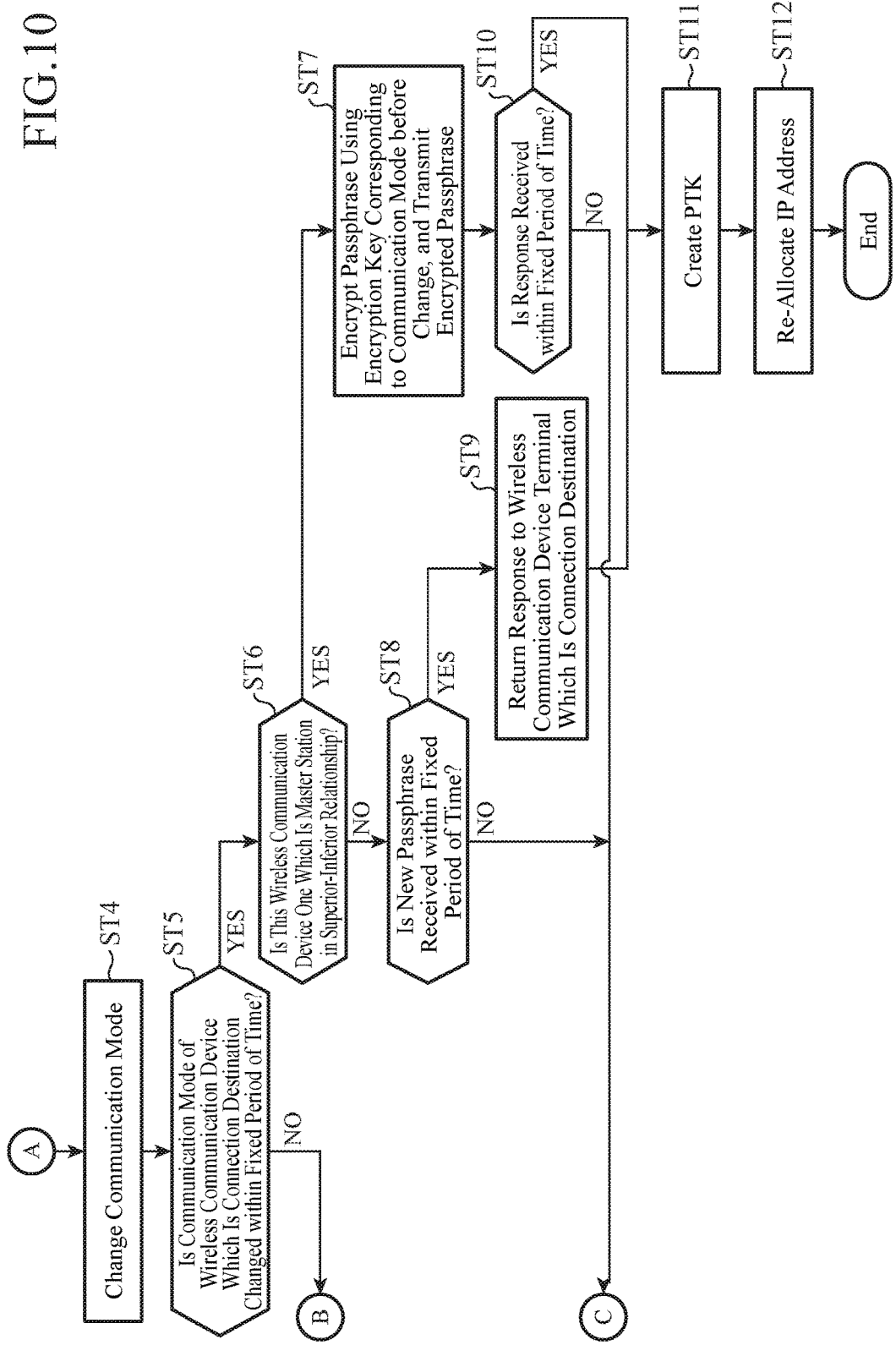
FIG. 10 is a flow chart showing a communication mode changing process performed by the wireless communication device which makes a request to change the communication mode (second half)
Figure 11:
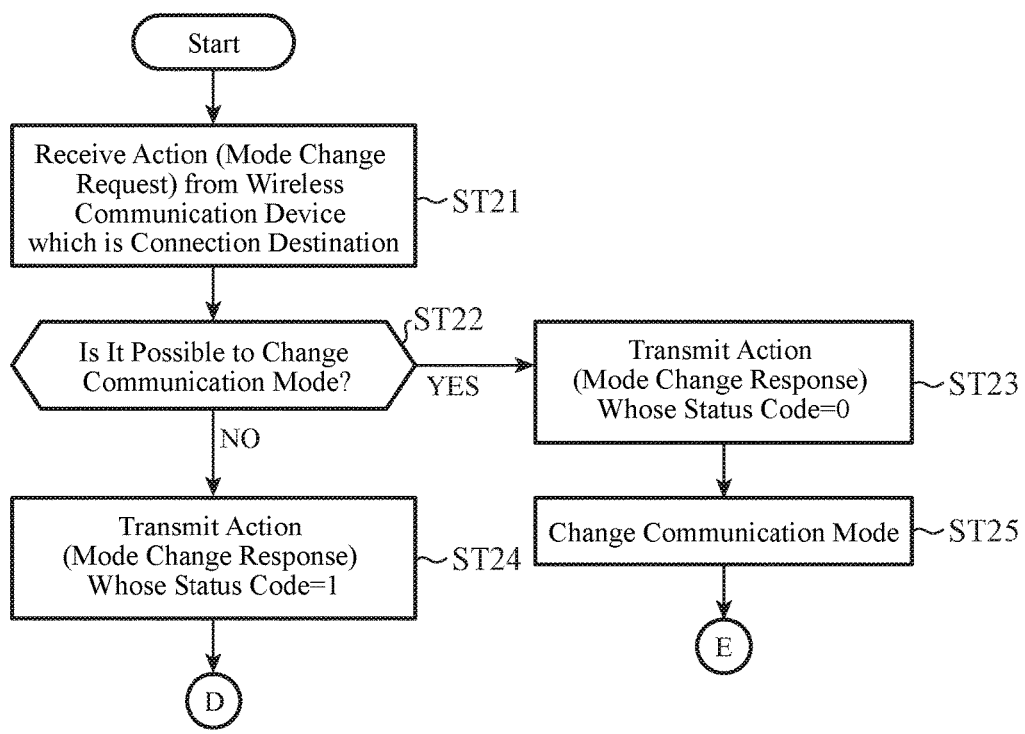
FIG. 11 is a flow chart showing a communication mode changing process performed by another wireless communication device which receives the request to change the communication mode (first half)
Figure 12:
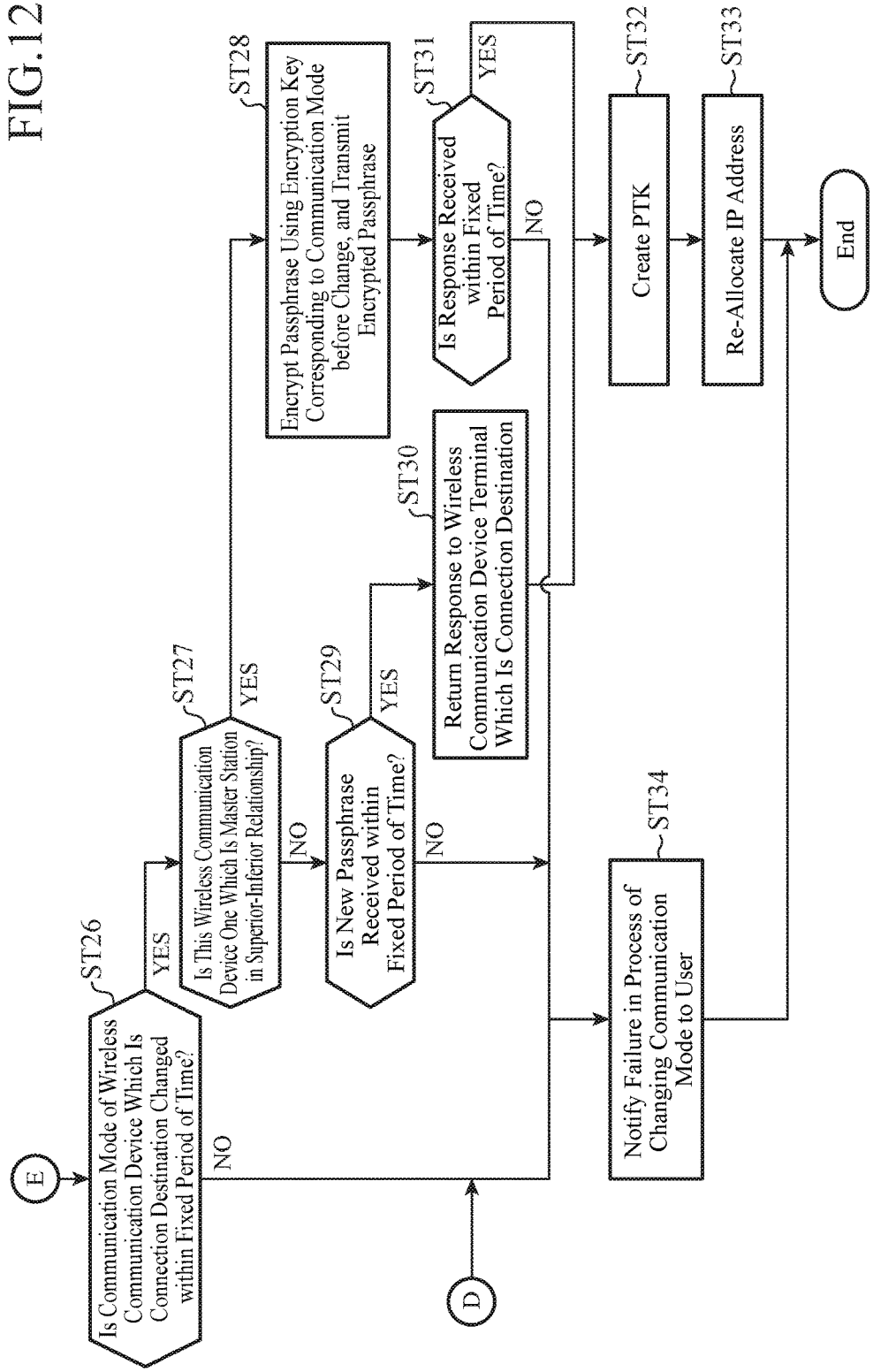
FIG. 12 is a flow chart showing a communication mode changing process performed by another wireless communication device which receives the request to change the communication mode (second half)

FIGS. 9 and 10 are flow charts showing a communication mode changing process performed by the wireless communication device that makes a request to change the communication mode, and FIGS. 11 and 12 are flow charts showing a communication mode changing process performed by the other wireless communication device that receives the request to change the communication mode.

Next, operations will be explained.

Before the wireless communication device 1 and the wireless communication device 2 start wireless communications between the devices, the user sets up a passphrase, which is a character string for authentication, for the wireless communication device 1 which is the master station, to cause this wireless communication device to create an encryption key PTK which is used when encrypting wireless communications.

In this Embodiment 1, because the WLAN controller 13 supports the six communication modes, the user sets up passphrases respectively corresponding to the six communication modes.

Although a procedure for creating the encryption key PTK is the same as that for use in conventional systems, the procedure for creating the encryption key PTK will be explained briefly hereafter.

Figure 4:
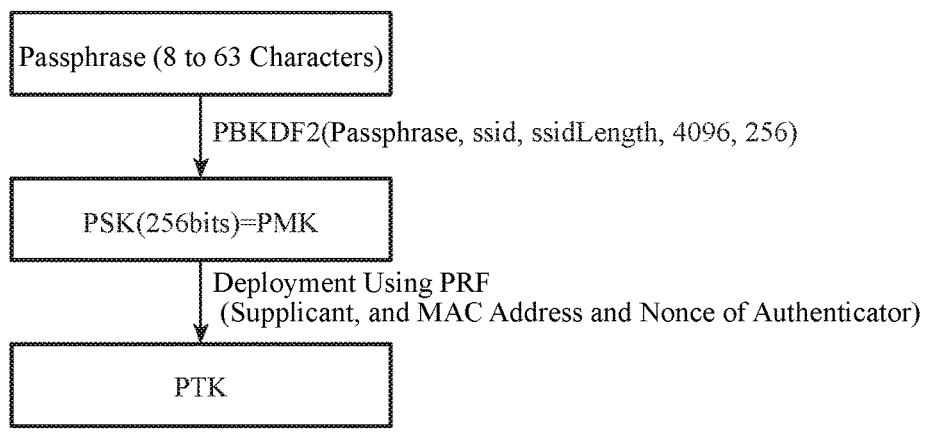
FIG. 4 is an explanatory drawing showing a procedure for creating an encryption key PMK in a case in which 8 to 63 ASCII characters are used as a passphrase.
Figure 5:
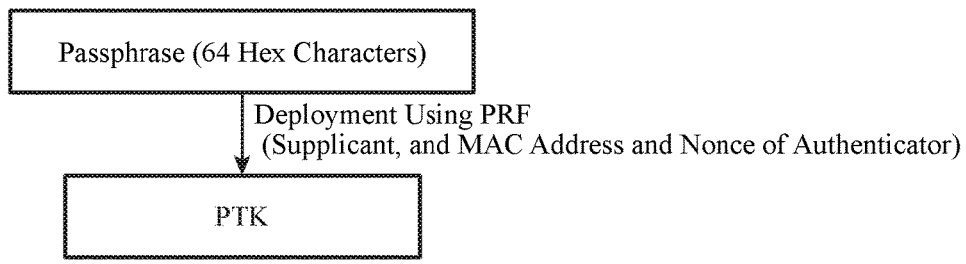
FIG. 5 is an explanatory drawing showing a procedure for creating an encryption key PMK in a case in which 64 Hex characters are used as a passphrase.

FIG. 4 is an explanatory drawing showing the procedure for creating an encryption key PMK in the case in which 8 to 63 ASCII characters are used as each of the passphrases. FIG. 5 is an explanatory drawing showing the procedure for creating the encryption key PMK in the case in which 64 Hex characters are used as each of the passphrases.

When the user sets up a passphrase, the security information controller 21 of the wireless communication device 1 creates PMK which is the encryption key for the creation of the encryption key PTK which is used when encrypting wireless communications, by using the passphrase.

At this time, when 8 to 63 ASCII characters are used as the passphrase, the security information controller creates the encryption key PMK by using the passphrase and ssid which is a network name, as shown in FIG. 4.

As an alternative, when 64 Hex characters are used as the passphrase, the security information controller uses the passphrase as the encryption key PMK (=PSK) just as it is, as shown in FIG. 5.

After creating the encryption key PMK, when the encryption method is the WPA-Personal method or the WPA2-Personal method, the security information controller 21 of the wireless communication device 1 deploys the encryption key PMK by using, as an input to a pseudo-random-function PRF, a supplicant which is software for implementing authentication conforming to IEEE802.1X, and the MAC address and the nonce of an authenticator which is a wireless communication device (an authentication device) that controls access of a terminal equipped with the supplicant to LAN, thereby creating the encryption key PTK.

Figure 6:
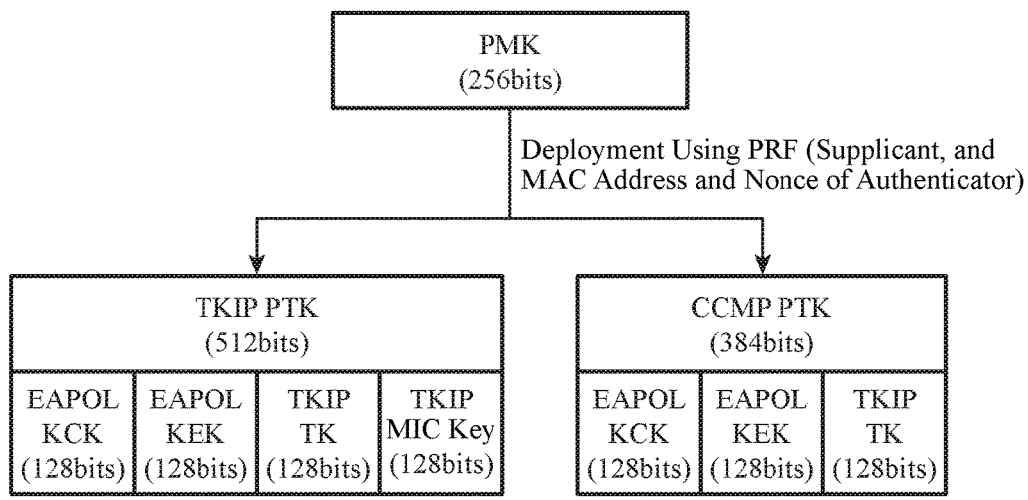
FIG. 6 is an explanatory drawing showing key hierarchical layers of pair keys in a WPA2 method for wireless LAN.

FIG. 6 is an explanatory drawing showing key hierarchical layers of pair keys in the WPA2 method for wireless LAN.

In an encryption protocol for use in wireless communication devices, in accordance with whether either an encryption key PTK conforming to TKIP (Temporal Key Integrity Protocol) or an encryption key PTK conforming to CCMP (Counter-mode CBC-MAC Protocol) is used, the key hierarchical layers of the created encryption key PTK differ.

Figure 7:
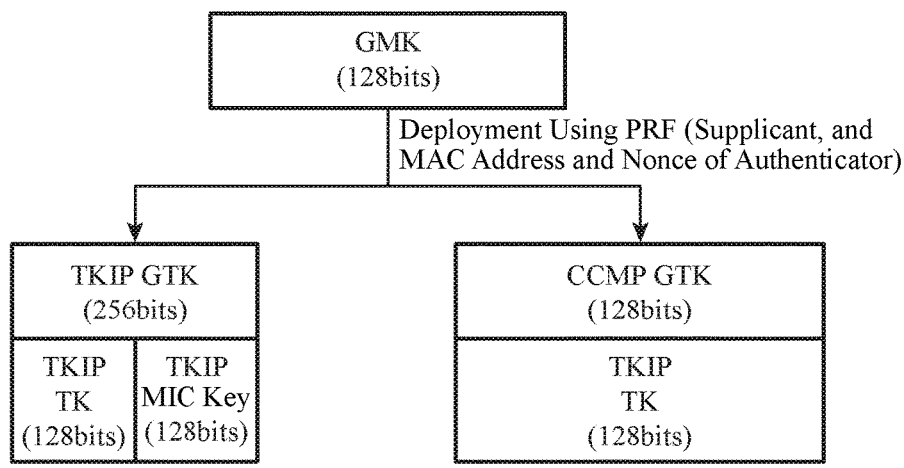
FIG. 7 is an explanatory drawing showing key hierarchical layers of group keys in the WPA2 method for wireless LAN.

Further, in the case of using the WPA-Personal method or the WPA2-Personal method, key hierarchical layers different from those for unicast transmission are used for broadcast transmission and multicast transmission, and, when a group master key GMK is created by using the same method as that used when creating an encryption key PMK, an encryption key GTK having group key hierarchical layers is created by deploying the group master key GMK by using, as an input to a pseudo-random-function PRF, the MAC address and the nonce of the authenticator. FIG. 7 is an explanatory drawing showing the key hierarchical layers of the group key in the case of using the WPA2 method for wireless LAN.

Next, the details of processing at the time when the wireless communication device 1 and the wireless communication device 2 start wireless communications with each other will be explained with reference to FIG. 8. However, because the details of processing at the time when the wireless communication devices start wireless communications with each other is the same as that performed in conventional systems, the details of processing will be briefly explained.

In this embodiment, for convenience of explanation, it is assumed that the wireless communication device 1 which is the master station operates in the STA mode in the infrastructure modes, and the wireless communication device 2 which is the slave station operates in the AP mode in the infrastructure modes.

The wireless communication device 1 which is the master station detects the wireless communication device 2 which is the slave station by scanning wireless communication devices by using the transmitter 11 and the receiver 12 (F101).

When the user inputs a passphrase for the wireless communication device 2 to the wireless communication device which is the master station, the security information controller 21 of the wireless communication device 1 outputs a wireless LAN frame, on which the passphrase is superposed, to the transmitter 11, thereby transmitting the wireless LAN frame to the wireless communication device 2, and also creates an encryption key PMK from the passphrase.

When the receiver 12 receives the wireless LAN frame, on which the passphrase is superposed, from the wireless communication device 1, the security information controller of the wireless communication device 2 creates an encryption key PMK from the passphrase superposed on the wireless LAN frame.

After creating the encryption keys PMKs, the wireless communication device 1 and the wireless communication device carry out a two-way exchange (F102) of authentication frames and a two-way exchange (F103) of association frames with each other, and, after that, carry out four-way communications (F104) of EAP frames, and each of the wireless communication devices then creates encryption keys PTK and GTK from the encryption key PMK.

The wireless communication device 1 and the wireless communication device 2 also carry out four-way communications (F105) of DHCP (Dynamic Host Configuration Protocol) packets, so that an IP address is allocated to the wireless communication device 2, and communications in the infrastructure modes can be carried out between the wireless communication device 1 and the wireless communication device 2 (F106).

Because the frames and the packets in F102 to F105 are known, and the transmission and reception of the frames and the packets are carried out by using a known technique, a detailed explanation of the frames and the packets and the transmission and reception will be omitted hereafter.

Next, the details of processing at the time of changing the communication mode from the infrastructure modes to the Wi-Fi direct mode will be explained with reference to FIGS. 8, 9 and 10.

When the user performs an operation of inputting a request to change the communication mode from the infrastructure mode to the Wi-Fi direct mode to the wireless communication device 1 which is the master station, the communication mode changing controller 20 of the wireless communication device 1 outputs an action (mode change request) frame, on which the communication mode change request showing the communication mode after change is superposed, and which is a wireless LAN frame, to the transmitter 11, thereby transmitting the action (mode change request) frame to the wireless communication device 2 (F107 of FIG. 8, in step ST1 of FIG. 9).

Although in this Embodiment 1 the example in which the user operates the wireless communication device 1 to input a request to change the communication mode from the infrastructure mode to the Wi-Fi direct mode is shown, the user can alternatively operate the wireless communication device 2 to input a request to change the communication mode from the infrastructure mode to the Wi-Fi direct mode. In this case, the wireless communication devices 1 and 2 respectively operate in a reverse manner in the above-mentioned operations.

Figure 13:
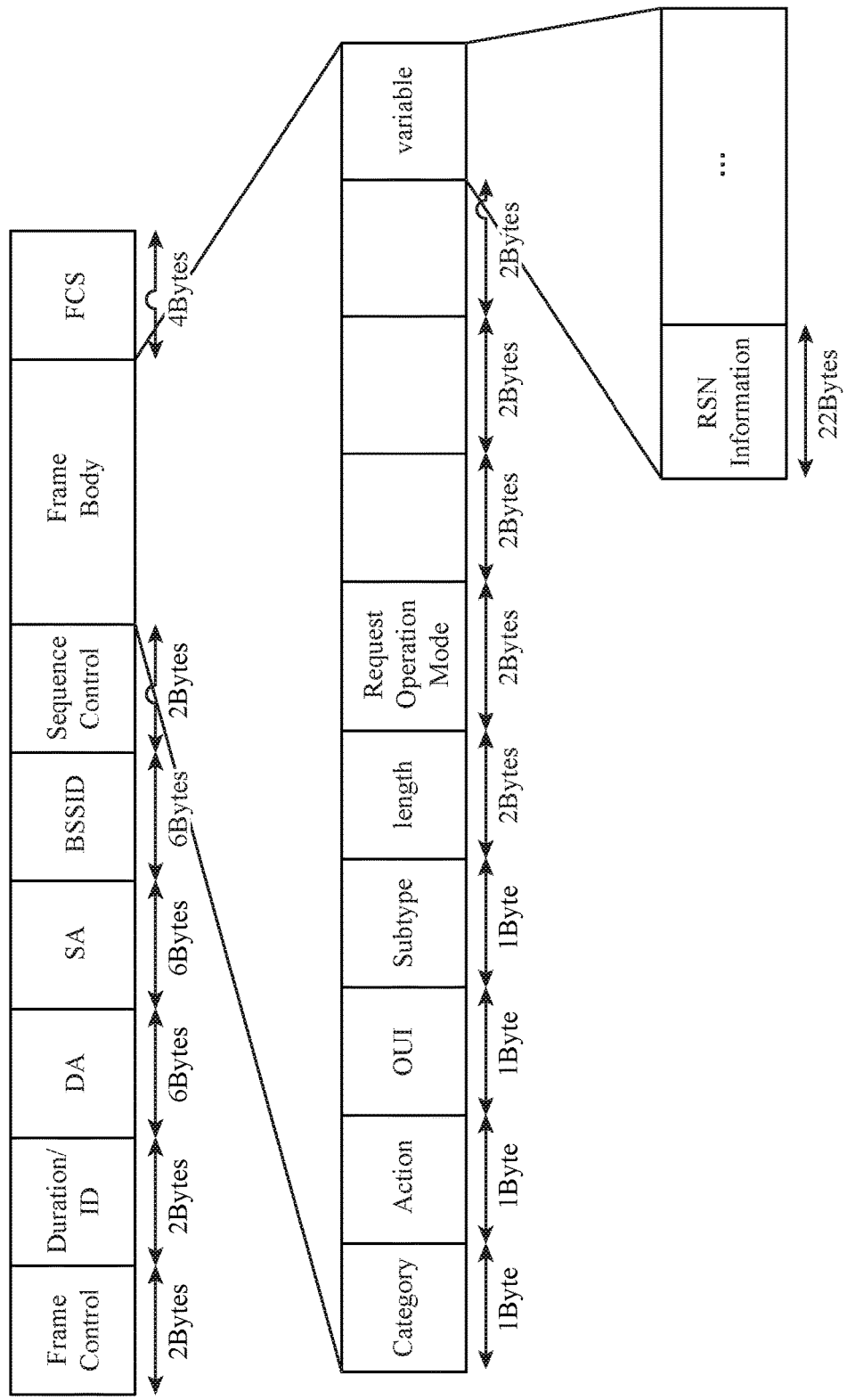
FIG. 13 is an explanatory drawing showing the format of an action (mode change request) frame.

FIG. 13 is an explanatory drawing showing the format of the action (mode change request) frame.

A "request operation mode field" which is a field showing the communication mode after change is included in the action (mode change request) frame.

Further, an "RSN information element" which is an element for notifying security setting information about the wireless communication device 1 to the wireless communication device 2 is included in the action (mode change request) frame. This element is defined in, for example, the following nonpatent literature 1.

Nonpatent literature 1: IEEE Computer Society, 802.11-2012—IEEE Standard for Information technology—Telecommunications and information exchange between systems Local and metropolitan area networks—Specific requirements Part 11: Wireless LAN Medium Access Control (MAC) and Physical Layer (PHY) Specifications For example, 0x002692 is set to OUI of the action (mode change request) frame, and a value of "1" shown in FIG. 14 is set to subtype. Their values are not limited to these values.

When the receiver 12 receives the action (mode change request) frame from the wireless communication device 1 (in step ST21 of FIG. 11), the communication mode changing controller 20 of the wireless communication device 2 recognizes the communication mode after change with reference to the request operation mode field of the action (mode change request) frame, and determines whether or not it is possible to change the communication mode (in step ST22).

In this Embodiment 1, because the communication mode after change is the Wi-Fi direct mode, and the WLAN controller 13 of the wireless communication device 2 supports the Wi-Fi direct mode (the WLAN controller is equipped with the Wi-Fi direct mode controller 16), the communication mode changing controller determines that it is possible to change the communication mode.

After determining whether or not it is possible to change the communication mode, the communication mode changing controller 20 of the wireless communication device 2 outputs an action (mode change response) frame, on which the response information showing whether or not it is possible to change the communication mode is superposed, and which is a wireless LAN frame, to the transmitter 11, thereby transmitting the action (mode change response) frame to the wireless communication device 1 (F108 of FIG. 8).

Figure 15:
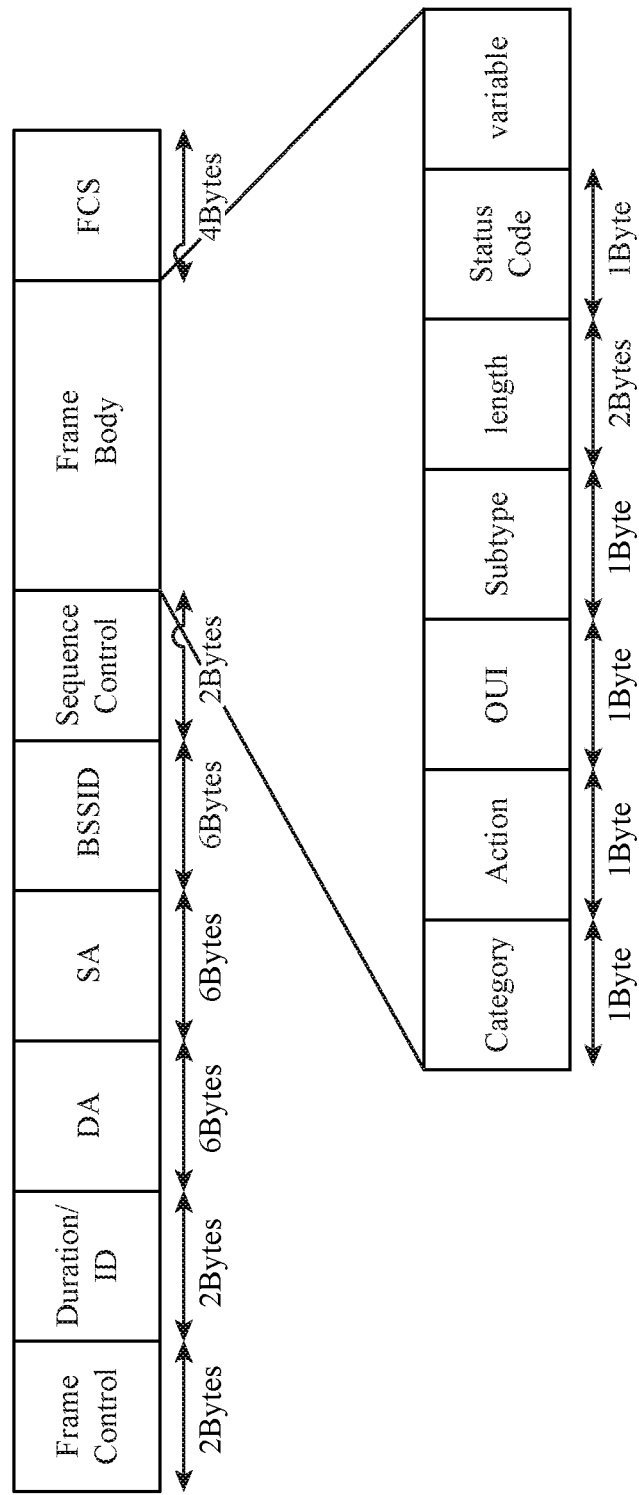
FIG. 15 is an explanatory drawing showing the of an action (mode change response) frame.

FIG. 15 is an explanatory drawing showing the action (mode change response) frame.

A "status code field" which is a field showing whether or not it is possible to change the communication mode (the response information) is included in the action (mode change response) frame.

When it is possible to change the communication mode, "0" is be set to the status code field (in step S123 of FIG. 11), whereas when it is impossible to change the communication mode, "1" is set to the status code field (in step S124).

For example, 0x002692 is set to OUI of the action (mode change response) frame, and a value of "2" shown in FIG. 14 is set to subtype. Their values are not limited to these values.

When the receiver 12 receives the action (mode change response) frame from the wireless communication device 2 within a fixed period of time after the wireless communication device 1 has transmitted the action (mode change request) frame (when Yes in step ST2 of FIG. 9), the WLAN controller 13 of the wireless communication device 1 recognizes the value of the status code field included in the action (mode change response) frame, and, when the value of the field is "0", determines that it is possible to change the communication mode. In contrast, when the value of the field is "1", the WLAN controller 13 determines that it is impossible to change the communication mode (in step ST3 of FIG. 9).

Also when the action (mode change response) frame is not transmitted from the wireless communication device 2 within the fixed period of time, the WLAN controller 13 determines that it is impossible to change the communication mode.

After determining that it is possible to change the communication mode, the WLAN controller 13 of the wireless communication device 1 performs the process of changing the communication mode from the infrastructure mode to the Wi-Fi direct mode (in step ST4 of FIG. 10).

Through the changing of the communication mode, the controller which is the target for operation is changed from the STA mode controller 14 to the Wi-Fi direct mode controller 16, and, after that, the Wi-Fi direct mode controller 16 carries out wireless communications.

Further, the WLAN controller 13 of the wireless communication device 2 performs the process of changing the communication mode from the infrastructure mode to the Wi-Fi direct mode when determining that it is possible to change the communication mode (in step S125 of FIG. 11).

Through the changing of the communication mode, the controller which is the target for operation is changed from the AP mode controller 15 to the Wi-Fi direct mode controller 16, and, after that, the Wi-Fi direct mode controller 16 carries out wireless communications.

After changing the communication mode from the infrastructure mode to the Wi-Fi direct mode, the WLAN controller 13 of each of the wireless communication devices 1 and 2 outputs a probe request frame including a P2P IE to the transmitter 11, thereby transmitting the probe request frame including the P2P IE to the corresponding one of the wireless communication devices 2 and 1 which are the communication partners.

When the receiver 12 receives the probe request frame including the P2P IE, the WLAN controller 13 of each of the wireless communication devices 1 and 2 recognizes that the corresponding one of the wireless communication devices 2 and 1 which are the communication partners has changed the communication mode from the infrastructure mode to the Wi-Fi direct mode.

By the way, when the communication mode is the AP mode in the infrastructure modes, the wireless communication device transmits a beacon frame, and, when the communication mode is the STA mode in the infrastructure modes, the wireless communication device transmits a probe request frame. Therefore, the WLAN controller of each of the wireless communication devices can confirm whether the communication mode has been changed by recognizing the frame transmitted from the corresponding one of the wireless communication devices 2 and 1 which are the communication partners (in step ST5 of FIG. 10 and in step S126 of FIG. 12).

After changing the communication mode, each of the wireless communication devices 1 and 2 carries out a known negotiation phase (F109 to F111 of FIG. 8).

In the Wi-Fi direct mode, when the negotiation phase is carried out, the superior-inferior relationship between the wireless communication device 1 and the wireless communication device 2 is determined. Because the process of determining the superior-inferior relationship between the wireless communication device 1 and the wireless communication device 2 is a known technique, a detailed explanation of the process will be omitted hereafter.

In this embodiment, although for convenience of explanation, it is assumed that the superior-inferior relationship between the wireless communication device 1 and the wireless communication device 2 is held unchanged even after the communication mode is changed (the wireless communication device 1 is the master station, and the wireless communication device 2 is the slave station), it should be noted that the wireless communication devices 1 and 2 simply operate in a reverse manner in the above-mentioned operations even if the superior-inferior relationship changes.

When the communication mode after change is a communication mode other than the Wi-Fi direct mode, the superior-inferior relationship between the wireless communication device 1 and the wireless communication device 2 does not change even if the communication mode is changed.

The security information controller 21 of the wireless communication device 1, which is the master station, encrypts the passphrase corresponding to the Wi-Fi direct mode which is the communication mode after change (i.e., the passphrase which is set up when the wireless communication device 1 and the wireless communication device 2 start wireless communications with each other) by using the encryption key PTK corresponding to the STA mode in the infrastructure modes which is the communication mode before change.

After encrypting the passphrase corresponding to the Wi-Fi direct mode, the security information controller 21 of the wireless communication device 1, which is the master station, outputs an EAP frame, on which the encrypted passphrase is superposed, and which is a wireless LAN frame, to the transmitter 11, thereby transmitting the EAP frame to the wireless communication device 2 (F112 of FIG. 8, in steps ST6 and ST7 of FIG. 10).

When the receiver 12 receives the EAP frame, on which the encrypted passphrase is superposed, from the wireless communication device 1 (in steps ST27 and ST29 of FIG. 12), the security information controller 21 of the wireless communication device 2, which is the slave station, outputs an EAP frame, so as to show the reception of the EAP frame, to the transmitter 11, as its response, thereby transmitting the EAP frame to the wireless communication device 1 (F113 of FIG. 8, in step ST30 of FIG. 12).

When the receiver 12 receives a response to this EAP frame from the wireless communication device 2 within a fixed period of time after the wireless communication device 1 has transmitted the EAP frame, on which the encrypted passphrase is superposed (when Yes in step ST10 of FIG. 10), the security information controller 21 of the wireless communication device 1, which is the master station, creates an encryption key PTK corresponding to the Wi-Fi direct mode from the passphrase corresponding to the Wi-Fi direct mode which is the communication mode after change by using the previously-explained method (in step ST11 of FIG. 10).

The security information controller 21 of the wireless communication device 2, which is the slave station, acquires the encrypted passphrase included in the EAP frame received by the receiver 12, and decrypts the encrypted passphrase by using the encryption key PTK corresponding to the AP mode in the infrastructure modes which is the communication mode before change.

After decrypting the encrypted passphrase, the security information controller 21 of the wireless communication device 2, which is the slave station, creates an encryption key PTK corresponding to the Wi-Fi direct mode which is the communication mode after change from the decrypted passphrase by using the previously-explained method (in step S132 of FIG. 12).

More specifically, after the wireless communication device 1 receives a response to the EAP frame and the wireless communication device 2 decrypts the encrypted passphrase, the wireless communication devices 1 and 2 carry out four-way communications (F114 of FIG. 8) of EAP frames with each other, and each of the wireless communication devices creates encryption keys PTK and GTK from the encryption key PMK.

Figure 16:
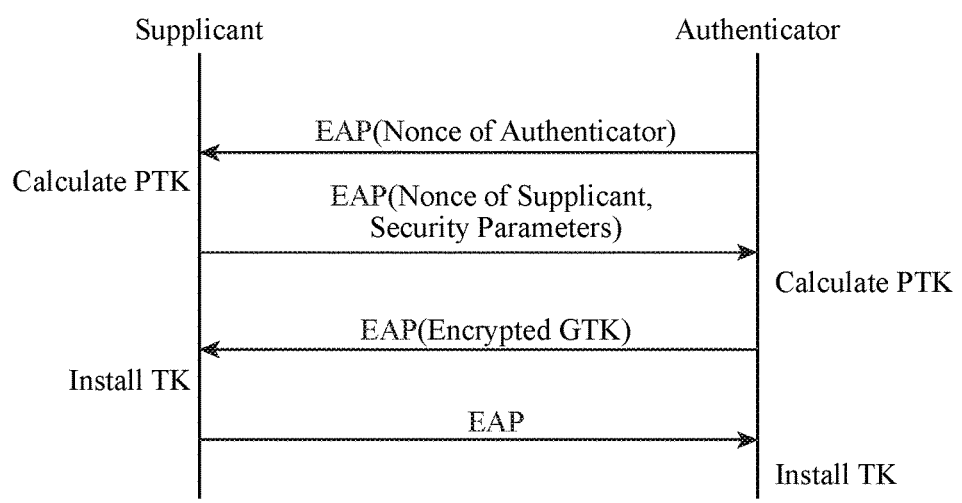
FIG. 16 is a sequence diagram showing a process of exchanging and setting pair keys by using a WPA2-Personal method.

FIG. 16 is a sequence diagram showing processing for exchanging and setting up pair keys in the WPA2-Personal method.

Because the processing for creating the encryption key PTK from the encryption key PMK is known, a detailed explanation of the processing will be omitted hereafter. By carrying out the processing in accordance with the sequence shown in FIG. 16, each of the wireless communication devices can create the encryption keys PTK and GTK from the encryption key PMK.

The wireless communication device 1 and the wireless communication device 2 also carry out four-way communications (F105 in FIG. 8) of DHCP packets, so that an IP address is allocated to the wireless communication device 2, and the wireless communication device 1 and the wireless communication device 2 can carry out communications in the Wi-Fi direct mode between the devices (F116 of FIG. 8, in step S112 of FIG. 10 and in step S133 of FIG. 12).

When the wireless communication device 1 and the wireless communication device 2 carry out wireless communications between the devices in the Wi-Fi direct mode, the Wi-Fi direct mode controller 16 of each of the wireless communication devices 1 and 2 carries out the wireless communications in the Wi-Fi direct mode by encrypting wireless data by using the encryption key PTK corresponding to the Wi-Fi direct mode.

When the receiver 12 has not received the action (mode change response) frame from the wireless communication device 2 within the fixed period of time after the WLAN controller 13 of the wireless communication device 1 has transmitted the action (mode change request) frame (when No in step S12 of FIG. 9), when the WLAN controller 13 of the wireless communication device 1 determines that it is impossible to change the communication mode (when No in step ST3 of FIG. 9), when the WLAN controller 13 of the wireless communication device 1 has not confirmed that the communication mode has been changed in the wireless communication device 2 which is the communication partner (when No in step ST5 of FIG. 10), or when the security information controller 21 of the wireless communication device 1, which is the master station, has not received any response to the EAP frame (when No in step ST10 of FIG. 10), the wireless communication device 1, which is the master station, notifies failure in the process of changing the communication mode to the user (in step ST13 of FIG. 9).

Similarly, when the communication mode changing controller 20 of the wireless communication device 2 determines that it is impossible to change the communication mode (when No in step S122 of FIG. 11), when the WLAN controller 13 of the wireless communication device 2 has not confirmed that the communication mode has been changed in the wireless communication device 2 which is the communication partner (when No in step S126 of FIG. 12), or when the security information controller 21 of the wireless communication device 2, which is the slave station, has not received the EAP frame, on which the encrypted passphrase is superposed (when No in step S129 of FIG. 12), the wireless communication device 1, which is the slave station, notifies failure in the process of changing the communication mode to the user (in step S134 of FIG. 12).

Figure 17:
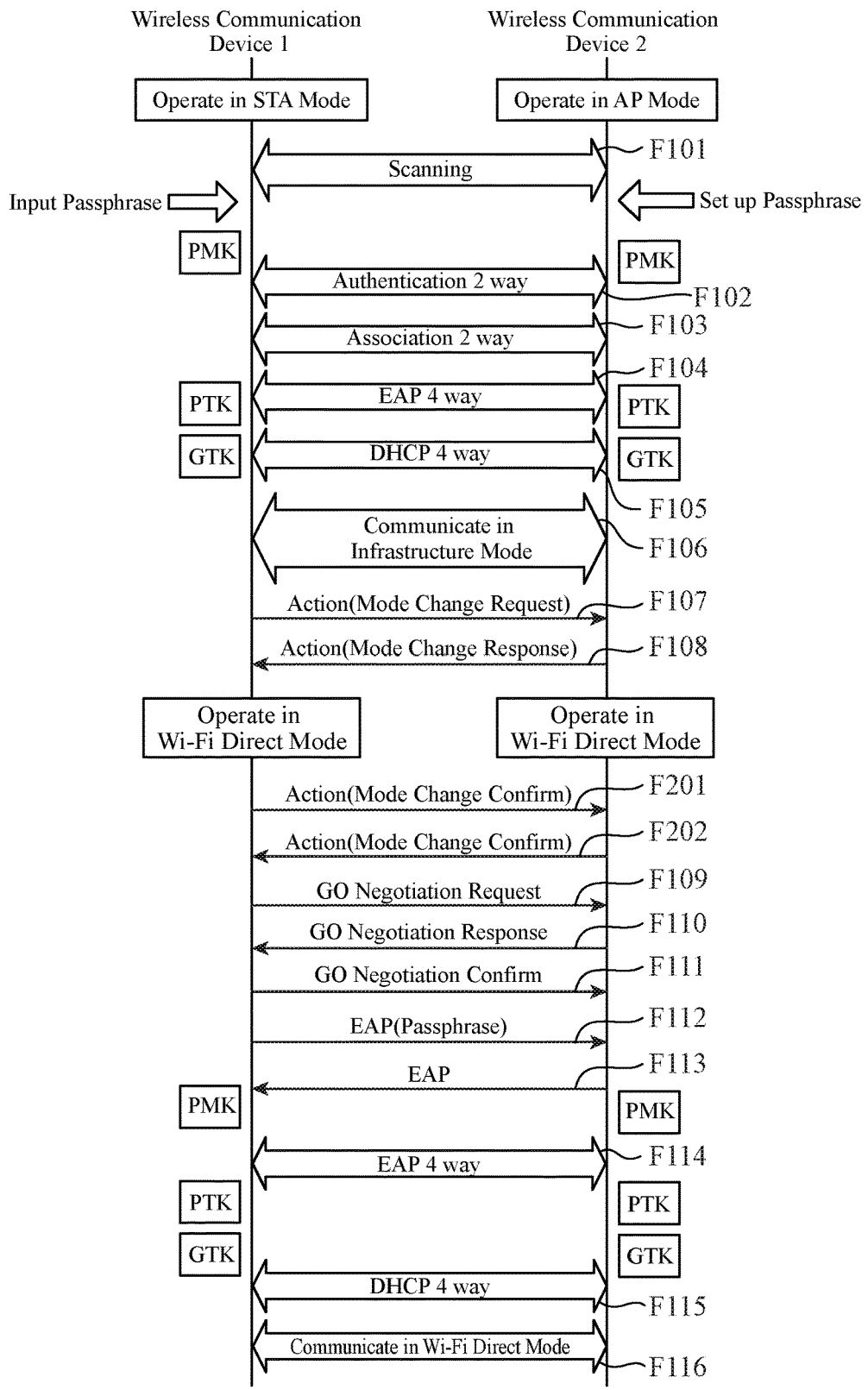
FIG. 17 is a sequence diagram showing a communication mode changing processing procedure when it is impossible to confirm whether the communication mode has been changed.

Although in this Embodiment 1 the example in which the WLAN controller 13 of each of the wireless communication devices 1 and 2 can confirm whether or not the communication mode has been changed in the corresponding one of the wireless communication devices 2 and 1 which are the communication partners is shown, when not having confirmed whether the communication mode has been changed in the corresponding one of the wireless communication devices 2 and 1 which are the communication partners, the WLAN controller 13 of each of the wireless communication devices 1 and 2 can confirm whether or not the communication mode has been changed in the corresponding one of the wireless communication devices 2 and 1 which are the communication partners by transmitting and receiving an action (mode change confirm) frame (F201 and F202 of FIG. 17), as shown in FIG. 17.

Figure 18:
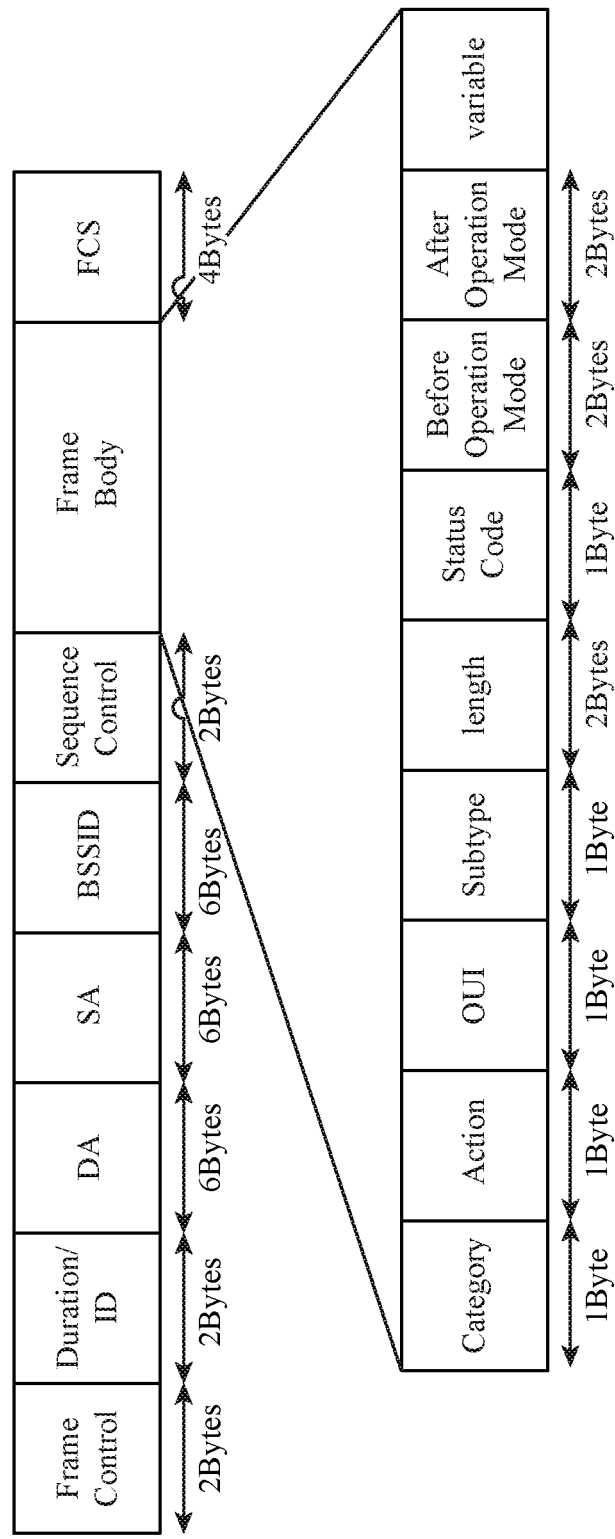
FIG. 18 is an explanatory drawing showing the format of an action (mode change confirm) frame.

FIG. 18 is an explanatory drawing showing the format of the action (mode change confirm) frame.

A "status code field" which is a field showing success or failure of the change of the communication mode is included in the action (mode change confirm) frame.

When the change of the communication mode has succeeded, "0" is set to the status code field, whereas when the change of the communication mode has failed, "1" is set to the status code field.

For example, 0x002692 is set to OUI of the action (mode change confirm) frame, and a value of "3" shown in FIG. 14 is set to subtype. Their values are not limited to these values.

When one of the wireless communication devices transmits an action (mode change confirm) frame and the other wireless communication device receives the action (mode change confirm) frame, the other wireless communication device can confirm whether the communication mode has been changed in the one of the wireless communication devices by recognizing the value of the status code field included in the action (mode change confirm) frame.

After confirming whether the communication mode has been changed, the other wireless communication device transmits, as a response to the action frame, an action (mode change confirm) frame to the one of the wireless communication devices (F202 of FIG. 17).

As can be seen from the above description, the wireless communication system according to this Embodiment 1 is configured in such a way that when changing the communication mode of the wireless communications, the wireless communication device 1 encrypts the passphrase which corresponds to the communication mode after change and which is a character string for authentication by using the encryption key PTK corresponding to the communication mode before change, and transmits the encrypted passphrase to the wireless communication device 2, and also creates an encryption key PTK corresponding to the communication mode after change from the passphrase corresponding to the communication mode after change, and the wireless communication device 2 receives the encrypted passphrase transmitted from the wireless communication device 1 and decrypts the above-mentioned encrypted passphrase by using the encryption key PTK corresponding to the communication mode before change, and also creates an encryption key PTK corresponding to the communication mode after change from the decrypted passphrase, so that there is an advantage in that when the communication modes of the wireless communications are changed, the re-establishment of a connection can be completed in a short time without causing the user to perform a troublesome operation of re-inputting a passphrase and a PIN code, and so on, and without transmitting and receiving many frames.

Although in this Embodiment 1 the example of changing the communication mode from an infrastructure mode to the Wi-Fi direct mode is shown, this changing between the communication modes is only an example and changing between other communication modes can be carried out. For example, changing from the Wi-Fi direct mode to an infrastructure mode can be implemented, or changing from the Wi-Fi direct mode to the ad-hoc mode, the NAN mode or the WiGig mode can be implemented.

Further, although in this Embodiment 1 the example in which the encryption method is the WPA2-Personal method is shown, this embodiment is not limited to this example. For example, the encryption method can be the WEP method, the WAPI method or the WPA method. Further, the encryption method can be changed before and after the communication mode is changed. It is preferable that the security information controller 21 of each of the wireless communication devices 1 and 2 supports at least two encryption methods.

Embodiment 2

Although in above-mentioned Embodiment 1 the example in which when changing the communication mode of wireless communications, the communication mode changing controller 20 of the wireless communication device 1 outputs an action (mode change request) frame, on which a communication mode change request showing the communication mode after change is superposed, and which is a wireless LAN frame, to the transmitter 11, thereby transmitting the action (mode change request) frame to the wireless communication device 2 is shown, the encryption key PTK corresponding to the communication mode before change can be diverted as the encryption key PTK corresponding to the communication mode after change when the master-slave relationship which is the superior-inferior relationship between the wireless communication device 1 and the wireless communication device 2 does not change before and after the communication mode of the wireless communications is changed.

Concretely, this embodiment is implemented as follows.

A communication mode changing controller 20 of a wireless communication device 1 which is a master station outputs a wireless LAN frame on which encryption key diversion information showing that an encryption key PTK corresponding to a communication mode before change is diverted is superposed to a transmitter 11, thereby transmitting the wireless LAN frame to a wireless communication device 2, when the superior-inferior relationship between the wireless communication devices 1 and 2 does not change before and after the communication mode of wireless communications is changed.

In this case, the communication mode changing controller 20 of the wireless communication device 1 does not perform a process of transmitting an encrypted passphrase corresponding to the communication mode after change to the wireless communication device 2.

When a receiver 12 receives the wireless LAN frame on which the encryption key diversion information is superposed, a security information controller 21 of the wireless communication device 2, which is a slave station, determines that encryption keys PTK and GTK corresponding to the communication mode before change are diverted as encryption keys PTK and GTK corresponding to the communication mode after change, instead of performing a process of decrypting an encrypted passphrase transmitted from the wireless communication device 1 and creating an encryption key PMK from the decrypted passphrase.

In this case, each of the wireless communication devices does not perform a process of carrying out four-way communications (F104), as shown in FIG. 8, of EAP frames, and then creating encryption keys PTK and GTK from an encryption key PMK.

However, because the specifications of the character string of ssid differ between the Wi-Fi direct mode and infrastructure modes, each of the wireless communication devices needs to re-create an encryption key PMK from the passphrase corresponding to the communication mode after change, and to carry out four-way communications (F104) of EAP frames, thereby creating encryption keys PTK and GTK from the encryption key PMK.

In this Embodiment 2, the communication mode changing controller 20 and the transmitter 11 of the wireless communication device 1 which is the master station construct a diversion information transmitter.

Embodiment 3

Figure 19:
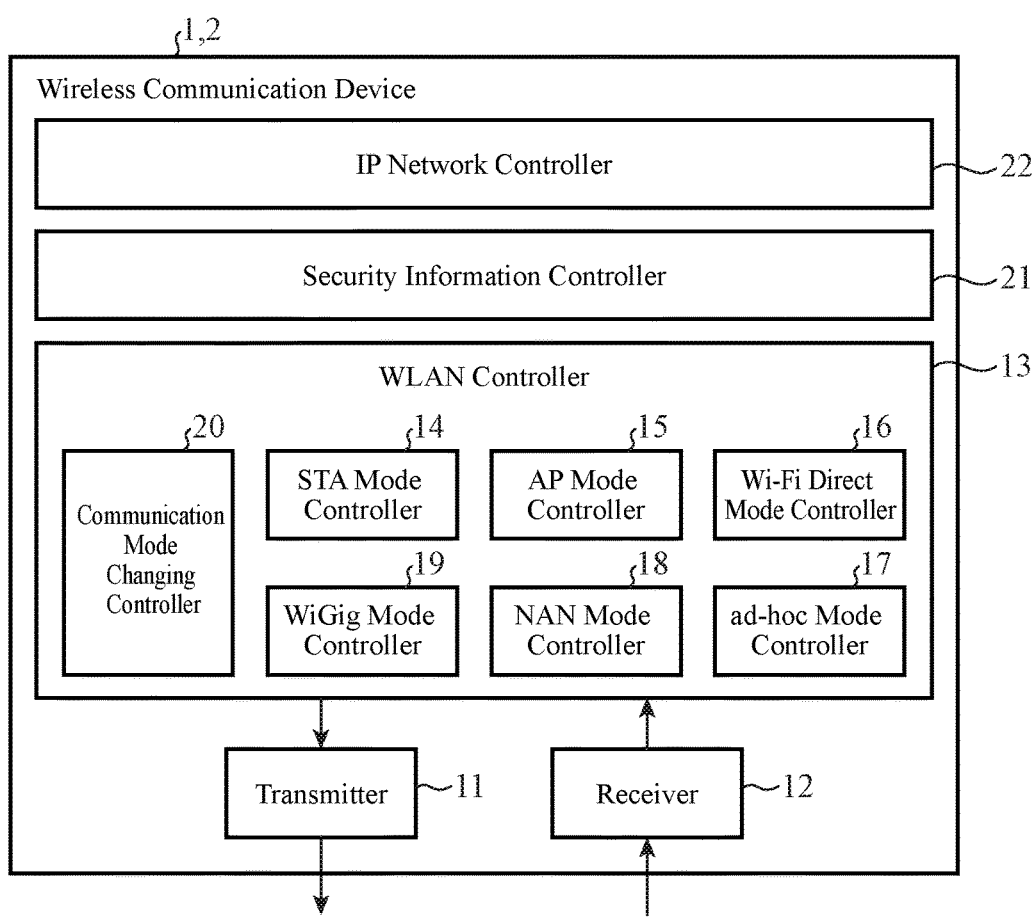
FIG. 19 is block diagram showing the internal configuration of each of wireless communication devices 1 and 2 which construct a wireless communication system according to Embodiment 3 of the present invention.

FIG. 19 is a block diagram showing the inside of each of wireless communication devices 1 and 2 which construct a wireless communication system according to Embodiment 3 of the present invention. Because in FIG. 19 the same reference numerals as those shown in FIG. 3 denote the same components or like components, the explanation of the components will be omitted hereafter.

An IP network controller 22 performs a process of allocating an IP address corresponding to a communication mode to a wireless communication device.

However, when a master-slave relationship which is a superior-inferior relationship between a wireless communication device 1 and a wireless communication device 2 does not change before and after the communication mode of wireless communications is changed, the IP network controller 22 determines whether or not it is possible to divert the IP address corresponding to the communication mode before change, and, when it is possible to divert the IP address, diverts the IP address corresponding to the communication mode before change as an IP address corresponding to a communication mode after change. The IP network controller 22 constructs an IP address allocator.

Figure 20:
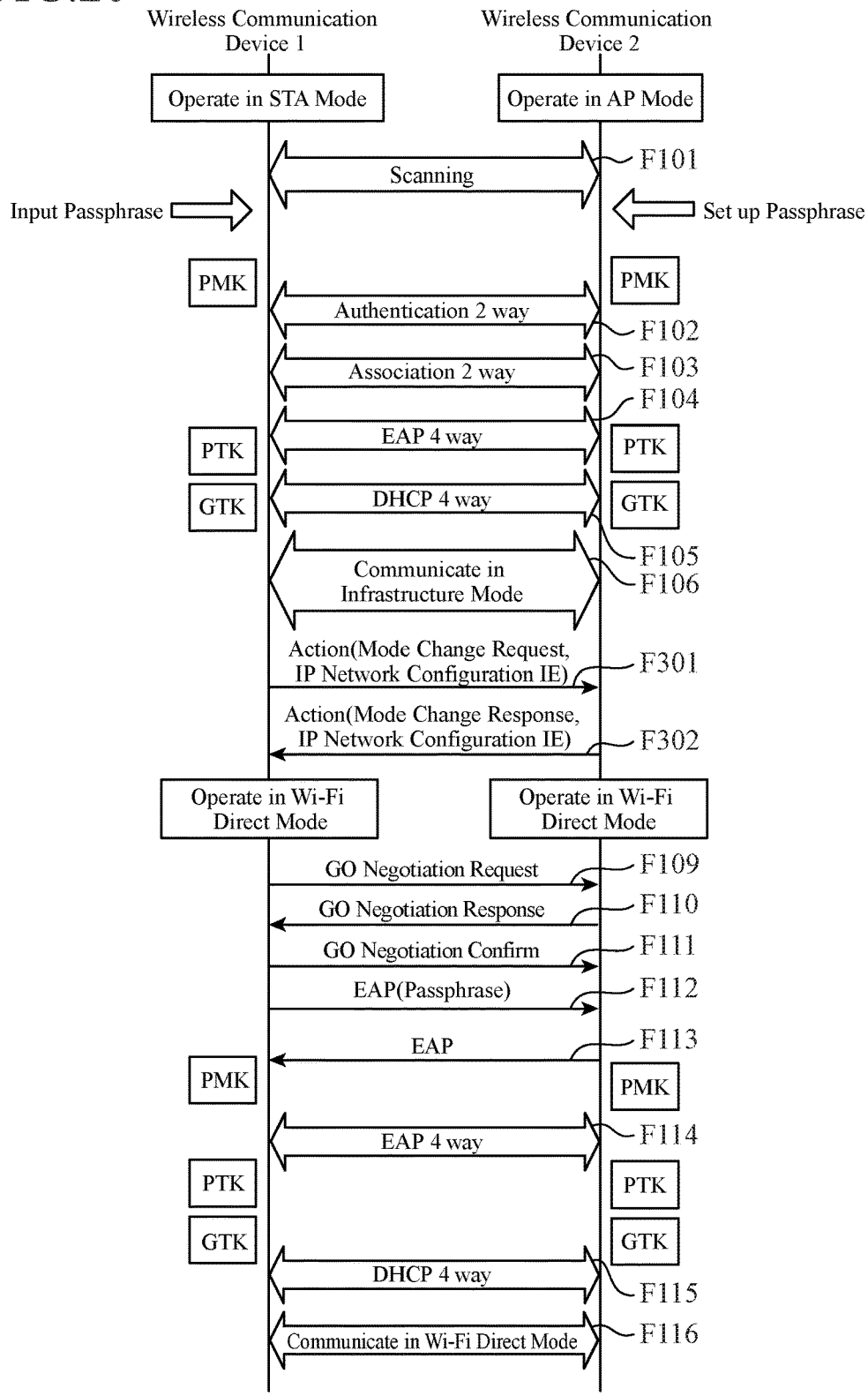
FIG. 20 is a sequence diagram showing a processing procedure at the time when the wireless communication devices 1 and 2 start wireless communications with each other, and a processing procedure at the time of changing the communication mode from an infrastructure mode to a Wi-Fi direct mode.

FIG. 20 is a sequence diagram showing a processing procedure at the time when the wireless communication devices 1 and 2 start wireless communications with each other, and a processing procedure at the time of changing the communication mode from an infrastructure mode to the Wi-Fi direct mode.

Next, operations will be explained.

Because the configuration of this embodiment is the same as that shown in above-mentioned Embodiments 1 and 2, except for the addition of the IP network controller 22, the details of processing performed by the IP network controller 22 will be explained mainly hereafter.

For example, when the user performs an operation of inputting a request to change the communication mode from an infrastructure mode to the Wi-Fi direct mode to the wireless communication device 1 which is a master station, if the master-slave relationship which is the superior-inferior relationship between the wireless communication devices 1 and 2 does not change, the IP network controller 22 of the wireless communication device 1 adds an IP network configuration continue element to an action (mode change request) frame as an element showing a request to divert the IP address corresponding to the communication mode before change at the time when a communication mode changing controller 20 outputs the action (mode change request) frame, on which a communication mode change request showing the communication mode after change is superposed, and which is a wireless LAN frame, to the transmitter 11.

Figure 21:
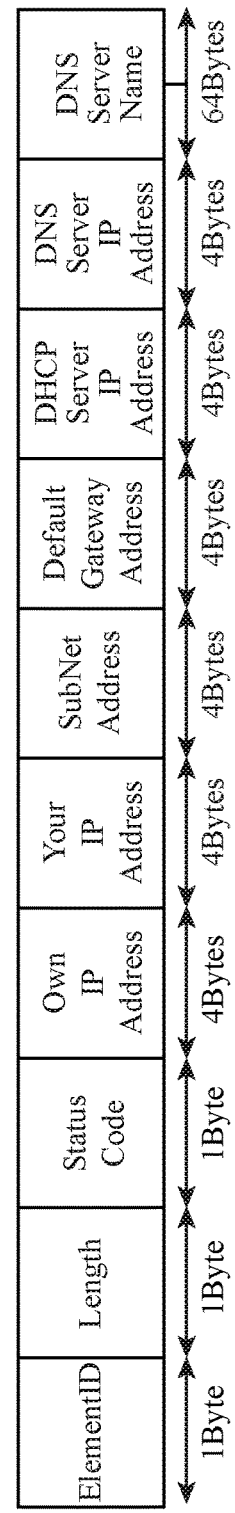
FIG. 21 is an explanatory drawing showing the format of an IP network configuration continue element.

FIG. 21 is an explanatory drawing showing the format of the IP network configuration continue element.

As a result, the action (mode change request) frame including the IP network configuration continue element is transmitted from the transmitter 11 of the wireless communication device 1 to the wireless communication device 2 (F301 of FIG. 20).

When a receiver 12 receives the action (mode change request) frame including the IP network configuration continue element from the wireless communication device 1, the IP network controller 22 of the wireless communication device 2 determines whether or not it is possible to divert the IP address corresponding to the communication mode before change.

For example, when the range of values which the IP address corresponding to the communication mode before change can have matches the range of values which the IP address corresponding to the communication mode after change can have, the IP network controller determines that it is possible to divert the IP address corresponding to the communication mode before change.

In contrast, when the range of values which the IP address corresponding to the communication mode before change can have does not match the range of values which the IP address corresponding to the communication mode after change can have, the IP network controller determines that it is impossible to divert the IP address corresponding to the communication mode before change.

As a concrete case in which it is impossible to divert the IP address, there is a case in which, for example, it is necessary to change the setting of an IP address, a subnet, a default gateway, or the like in accordance with a change of the communication mode.

When determining that it is possible to divert the IP address, the IP network controller 22 of the wireless communication device 2 sets "0" to a status code field of an IP network configuration continue element, and transmits, as a response, an action (mode change response) frame including this IP network configuration continue element to the wireless communication device 1 (F302 of FIG. 20).

In contrast, when determining that it is impossible to divert the IP address, the IP network controller sets "0" to the status code field of the IP network configuration continue element, and transmits, as a response, an action (mode change response) frame including this IP network configuration continue element to the wireless communication device 1 (F302 of FIG. 20).

When a receiver 12 receives the action (mode change response) frame including the IP network configuration continue element from the wireless communication device 2, the IP network controller 22 of the wireless communication device 1 determines that it is possible to divert the IP address in the wireless communication device 2 when the value of the status code field of the IP network configuration continue element is "0."

After that, the wireless communication device 2 diverts the IP address of the wireless communication device 2, the IP address corresponding to the communication mode before change, as the IP address of the wireless communication device 2, the IP address corresponding to the communication mode after change.

The IP network controller 22 of the wireless communication device 1 determines that it is impossible to divert the IP address in the wireless communication device 2 when the value of the status code field of the IP network configuration continue element is "1."

In this case, the IP network controller 22 of the wireless communication device 1 carries out four-way communications (F105 of FIG. 8) of DHCP (Dynamic Host Configuration Protocol) packets with the IP network controllers 22 of the wireless communication device 2, thereby allocating an IP address to the wireless communication device 2, like the wireless communication devices according to above-mentioned Embodiments 1 and 2.

Also when the master-slave relationship which is the superior-inferior relationship between the wireless communication devices 1 and 2 changes before and after the communication mode of wireless communications is changed, the IP network controller allocates an IP address to the wireless communication device 2 by carrying out four-way communications (F105 of FIG. 8) of DHCP packets.

As can be seen from the above description, because the wireless communication system according to this Embodiment 3 is configured in such a way that when the master-slave relationship which is the superior-inferior relationship between the wireless communication devices 1 and 2 does not change before and after the communication mode of wireless communications is changed, determine whether or not it is possible to divert the IP address corresponding to the communication mode before change, and, when it is possible to divert the IP address, divert the IP address corresponding to the communication mode before change as the IP address corresponding to the communication mode after change, there is provided an advantage of simplifying the process of transmitting and receiving fames at the time of re-establishing a connection between the wireless communication devices, thereby implementing high-speed re-establishment of a connection between the wireless communication devices.

Embodiment 4

Although in above-mentioned Embodiments 1 to 3 the example in which the wireless communication system is comprised of the two wireless communication devices 1 and 2, the wireless communication system can be alternatively comprised of three or more wireless communication devices.

Figure 22:
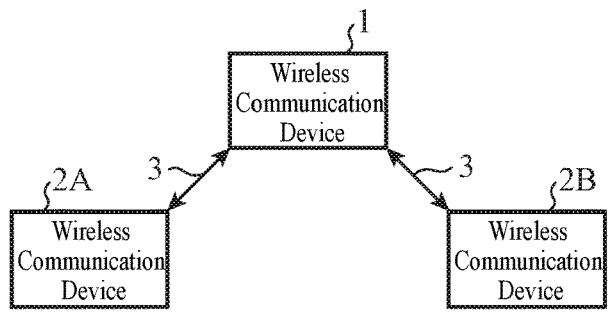
FIG. 22 is a block diagram showing a wireless communication system comprised of three wireless communication devices.

FIG. 22 is a block diagram showing a wireless communication system comprised of three wireless communication devices. Referring to FIG. 22, wireless communication devices 2A and 2B are slave stations each of which corresponds to the wireless communication device 2 shown in FIG. 1.

Although in the example shown in FIG. 22 the wireless communication device 1 is a master station and the wireless communication devices 2A and 2B are slave stations, and, when a superior-inferior relationship between the wireless communication device 1 and the wireless communication devices 2A and 2B does not change before and after the communication mode is changed, the wireless communication device 1 encrypts a passphrase corresponding to a communication mode after change by using an encryption key PTK corresponding to a communication mode before change, and transmits the encrypted passphrase to the wireless communication devices 2A and 2B, like that according to above-mentioned Embodiment 1, thereby being able to simplify the user's operation and a processing sequence for transmitting and receiving frames at the time of re-establishing a connection between the wireless communication device 1 and the wireless communication devices 2A and 2B.

Figure 23:
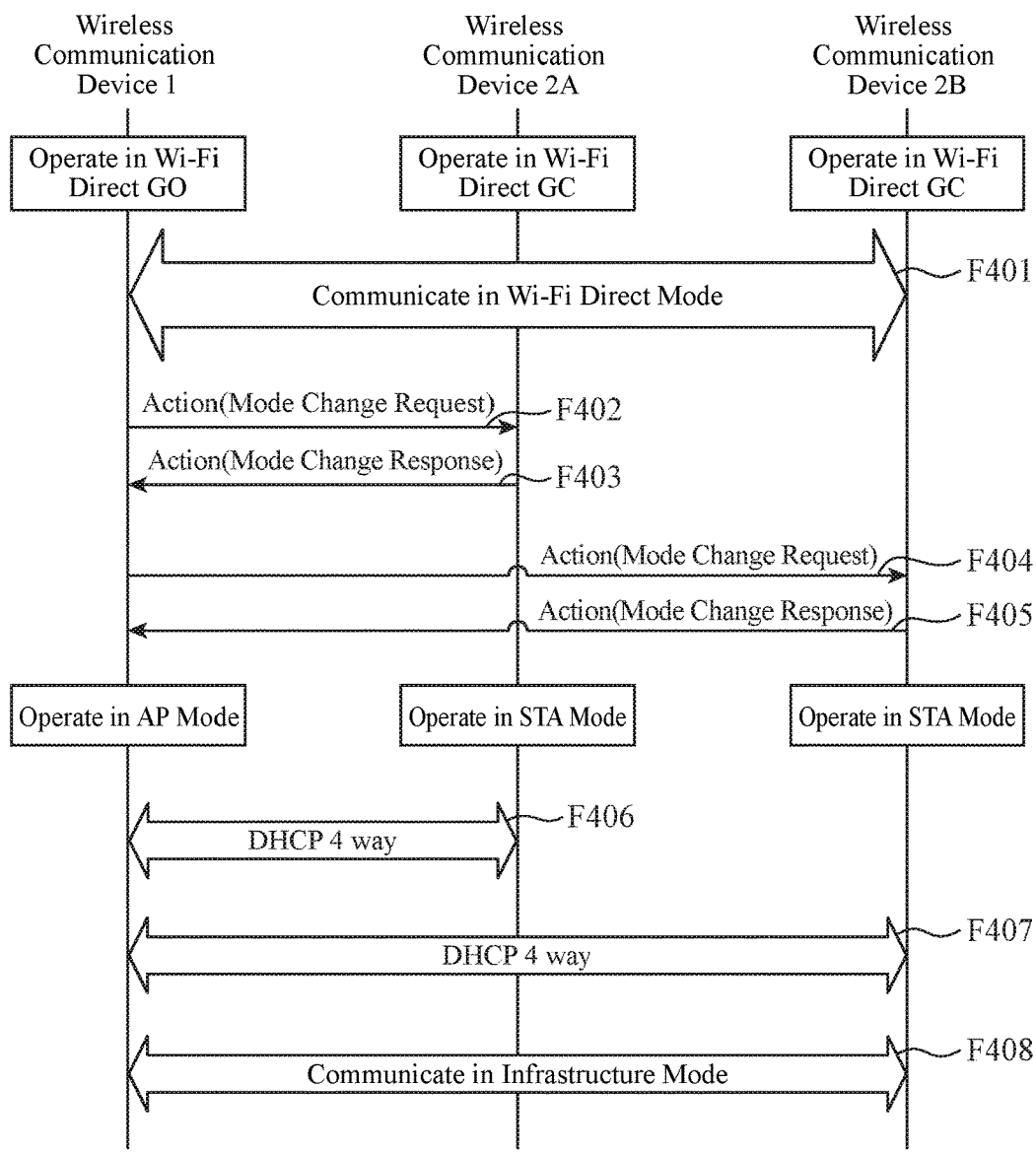
FIG. 23 is a sequence diagram showing a processing procedure at the time when each of the three wireless communication devices changes its communication mode.

FIG. 23 is a sequence diagram showing a processing procedure at the time when the three wireless communication devices change the communication mode.

Hereafter, the details of processing at the time when the wireless communication device 1, which is the master station, makes a request of the wireless communication device 2A and 2B, which are the slave stations, to change the communication mode, and then changes the communication mode will be explained with reference to FIG. 23.

First, a communication mode changing controller 20 of the wireless communication device 1 sequentially transmits an action (mode change request) frame to the wireless communication devices 2A and 2B (F402 and F404 of FIG. 23).

When a receiver 12 receives the action (mode change request) frame from the wireless communication device 1, a communication mode changing controller 20 of each of the wireless communication devices 2A and 2B determines whether or not it is possible to change the communication mode, and transmits an action (mode change response) frame including a result of the determination to the wireless communication device 1 (F403 and F405 of FIG. 23), like that according to above-mentioned Embodiment 1.

When determining that it is possible to change the communication mode, the communication mode changing controller 20 of each of the wireless communication devices 2A and 2B changes the communication mode. In the example shown in FIG. 23, the communication mode changing controller changes the communication mode from the Wi-Fi direct mode to the STA mode in the infrastructure modes.

When a receiver 12 receives the action (mode change response) frame from each of the wireless communication devices 2A and 2B, the communication mode changing controller 20 of the wireless communication device 1 refers to the action (mode change response) frame to check whether or not it is possible to change the communication mode of the corresponding one of the wireless communication devices 2A and 2B, and, when it is possible to change the communication mode, changes the communication mode. In the example shown in FIG. 23, the communication mode changing controller changes the communication mode from the Wi-Fi direct mode to the AP mode in the infrastructure modes.

When confirming that the communication mode of each of the wireless communication devices 2A and 2B has changed, the communication mode changing controller 20 of the wireless communication device 1 re-allocates IP addresses to the wireless communication devices 2A and 2B by performing four-way communications of DHCP packets (F406 and F407 of FIG. 23), and, after that, carries out wireless communications in the infrastructure mode by using encryption keys PTK and GTK which have been provided before the communication mode is changed (F408 of FIG. 23), like that according to above-mentioned Embodiment 1.

A security information controller 21 of the wireless communication device 1 can update the encryption keys PTK and GTK of the wireless communication devices communicating with each other in accordance with an encryption key updating sequence shown in FIG. 16 at the time that the communication mode is changed, like in the case of conventional examples.

Further, when ssid of the wireless communication device 1 changes, after re-creating an encryption key PMK, each of the wireless communication devices 1, 2A and 2B can update the encryption keys PTK and GTK of the wireless communication devices communicating with each other in accordance with the encryption key updating sequence shown in FIG. 16.

As an alternative, after notifying the passphrase corresponding to the communication mode after change to the wireless communication devices 2A and 2B by using an EAP frame, the wireless communication device 1 can update the encryption keys PTK and GTK of the wireless communication devices communicating with each other in accordance with the encryption key updating sequence shown in FIG. 16.

When either one of the wireless communication devices 2A and 2B, which are the slave stations, makes a request of the wireless communication device 1, which is the master station, to change the communication mode, the wireless communication device 1, which is the master station, can transmit an action (mode change response) frame to the wireless communication device 2A or 2B, to change the communication mode while maintaining the superior-inferior relationship between them. As an alternative, a wireless communication device 2 which has made a request to change the communication mode and which is a slave station, and the wireless communication device 1 which is the master station can change the communication mode only between them.

Although in this Embodiment 4 the example in which the number of wireless communication devices 2 which are the slave stations are two is shown, it is needless to say that the number of wireless communication devices 2 which are the slave stations can be three or more.

Further, there can be a case in which connections with some wireless communication devices are not re-established after the communication mode is changed. For example, when the communication mode is changed from an infrastructure mode to the Wi-Fi direct mode, a connection with the wireless communication device 2B cannot be re-established when the wireless communication device 2B does not support the Wi-Fi direct mode even though the wireless communication device 2A which is a slave station supports the Wi-Fi direct mode. The occurrence of such a situation can be allowed.

Although in this Embodiment 4 the example which the communication mode is changed from the Wi-Fi direct mode to an infrastructure mode is shown, this changing between the communication modes is only an example and changing between other communication modes can be carried out.

Although in above-mentioned Embodiments 1 to 4 the example in which the wireless communication device 1 and a wireless communication device 2 carry out wireless communications with each other by using a wireless LAN is shown, the present invention is not limited to the wireless LAN. For example, by using Bluetooth (a registered trademark, a short-range radio communications standard for digital equipment), ZigBee (a short-range radio communications standard mainly aimed for sensor networks), or the like, the wireless communication device 1 and a wireless communication device 2 can carry out wireless communications with each other.

While the invention has been described in its preferred embodiments, it is to be understood that an arbitrary combination of two or more of the above-mentioned embodiments can be made, various changes can be made in an arbitrary component in accordance with any one of the above-mentioned embodiments, and an arbitrary component in accordance with any one of the above-mentioned embodiments can be omitted within the scope of the invention.

INDUSTRIAL APPLICABILITY

The wireless communication system according to the present invention is suitable for use as a wireless communication system which needs to re-establish a connection in a short time when a plurality of wireless communication devices change the communication mode of wireless communications.

REFERENCE SIGNS LIST

1 wireless communication device (first wireless communication device), 2 wireless communication device (second wireless communication device), 3 wireless link, 4 car (vehicle), 11 transmitter (transmitter and receiver, communication mode changer, passphrase transmitter, and diversion information transmitter), 12 receiver (transmitter and receiver, communication mode changer, and passphrase receiver), 13 WLAN controller, 14 STA mode controller, 15 AP mode controller, 16 Wi-Fi direct mode controller, 17 ad-hoc mode controller, 18 NAN mode controller, 19 WiGig mode controller, 20 communication mode switching controller (transmitter and receiver, communication mode changer, and diversion information transmitter), 21 security information controller (first encryption key creator and second encryption key creator), and 22 IP network controller (IP address allocator).

The invention claimed is:

1. A wireless communication system in which a first wireless communication device and a second wireless communication device carry out wireless communications with each other, wherein said first wireless communication device includes:

a passphrase transmitter to, when changing a communication mode of said wireless communications, encrypt a passphrase which corresponds to a communication mode after change of a mode and which is a character string for authentication by using an encryption key corresponding to a communication mode before the change of the mode, and to transmit the encrypted passphrase to said second wireless communication device; and a first encryption key creator to create an encryption key corresponding to the communication mode after the change of the mode from the passphrase corresponding to said communication mode after the change of the mode, and said second wireless communication device includes:
a passphrase receiver to receive the encrypted passphrase transmitted from said passphrase transmitter and to decrypt said encrypted passphrase by using an encryption key corresponding to said communication mode before the change of the mode; and
a second encryption key creator to create an encryption key corresponding to the communication mode after the change of the mode from the passphrase decrypted by said passphrase receiver,
and wherein said first and second wireless communication devices carry out said wireless communications with each other by using the encryption keys created by said first and second encryption key creators, after the change of the mode.

2. The wireless communication system according to claim 1, wherein each of said first and second wireless communication devices includes:
a transmitter and receiver to, when changing the communication mode of said wireless communications, transmit a communication mode change request, showing the communication mode after the change of the mode, to a wireless communication device which is a communication partner, and receive response information showing whether or not it is possible to change the communication mode from said wireless communication device which is the communication partner, and to also receive said communication mode change request from said wireless communication device which is the communication partner; and
a communication mode changer to, when response information is received by said transmitter and receiver and shows that it is possible to change the communication mode, perform a process of changing said communication mode, and to, when a communication mode change request is received by said transmitter and receiver, determine whether or not it is possible to change to the communication mode shown by said communication mode change request, and output response information showing whether or not it is possible to change to said communication mode to said transmitter and receiver, thereby transmitting said response information to said wireless communication device which is the communication partner, and to, when determining that it is possible to change to the communication mode shown by said communication mode change request, also perform the process of changing said communication mode.

3. The wireless communication system according to claim 1, wherein said first wireless communication device includes a diversion information transmitter to, when a master-slave relationship which is a superior-subordinate relationship between said first and second wireless communication devices does not change before and after the communication mode of said wireless communications is changed, transmit encryption key diversion information showing diversion of the encryption key corresponding to said communication mode before change to said second wireless communication device, and wherein when receiving said encryption key diversion information from said diversion information transmitter, said second encryption key creator of said second wireless communication device diverts the encryption key corresponding to said communication mode before change as the encryption key corresponding to said communication mode after change, instead of performing the process of creating the encryption key corresponding to said communication mode after change from the passphrase decrypted by said passphrase receiver.

4. The wireless communication system according to claim 1, wherein said first wireless communication device includes an IP address allocator to allocate an IP address corresponding to said communication mode after the change of the mode to said second wireless communication device.

5. The wireless communication system according to claim 4, wherein when a master-slave relationship which is a superior-subordinate relationship between said first and second wireless communication devices does not change before and after the communication mode of said wireless communications is changed, said IP address allocator determines whether or not it is possible to divert an IP address corresponding to said communication mode before the change of the mode, and, when it is possible to divert the IP address, diverts the IP address corresponding to said communication mode before the change of the mode as the IP address corresponding to said communication mode after the change of the mode.

6. The wireless communication system according to claim 1, wherein said first and second wireless communication devices carry out wireless communications using a wireless LAN with each other.

7. The wireless communication system according to claim 6, wherein each of said first and second wireless communication devices supports two or more of communication modes including an infrastructure mode, a Wi-Fi direct mode, an ad-hoc mode, a wireless gigabit mode and an NAN (Neighborhood Area Network) mode, which are wireless LAN communication modes.

8. The wireless communication system according to claim 6, wherein each of said first and second wireless communication devices supports two or more of encryption methods including a WEP (Wired Equivalent Privacy) method, a WAPI (Wireless Ian Authentication and Privacy Infrastructure) method, a WPA (Wi-Fi Protected Access) method and a WPA2 method, which are encryption methods for wireless LAN.

9. The wireless communication system according to claim 1, wherein said first wireless communication device or said second wireless communication device is used as vehicle-mounted equipment mounted in a vehicle.

10. A wireless communication method in which a first wireless communication device and a second wireless communication device carry out wireless communications with each other, said wireless communication method comprising:
in said first wireless communication device, when changing a communication mode of said wireless communications, encrypting a passphrase which corresponds to a communication mode after change of a mode and which is a character string for authentication by using an encryption key corresponding to a communication mode before the change of the mode and transmitting the encrypted passphrase to said second wireless communication device, and also creating an encryption key corresponding to the communication mode after the change of the mode from the passphrase corresponding to said communication mode after the change of the mode; and
in said second wireless communication device, receiving the encrypted passphrase transmitted from said first wireless communication device and decrypting said encrypted passphrase by using an encryption key corresponding to said communication mode before the change of the mode, and also creating an encryption key corresponding to the communication mode after the change of the mode from the decrypted passphrase, and said first and second wireless communication devices carrying out said wireless communications with each other by using the encryption keys corresponding to said communication mode after the change of the mode.

* * * * *